(12) United States Patent
Fu et al.

(10) Patent No.: US 10,804,808 B1
(45) Date of Patent: Oct. 13, 2020

(54) METHOD AND SYSTEM FOR CONTROLLING SWITCHING OF A DIRECT CURRENT TO DIRECT CURRENT CONVERTER

(71) Applicant: Deere & Company, Moline, IL (US)

(72) Inventors: Tianjun Fu, West Fargo, ND (US); Long Wu, Fargo, ND (US); Rachit Agarwal, Tallahassee, FL (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 16/502,287

(22) Filed: Jul. 3, 2019

(51) Int. Cl.
*H02M 3/335* (2006.01)
*H02M 1/00* (2006.01)

(52) U.S. Cl.
CPC ... *H02M 3/33576* (2013.01); *H02M 3/33507* (2013.01); *H02M 2001/0054* (2013.01)

(58) Field of Classification Search
CPC ......... H02M 3/33507; H02M 3/33523; H02M 3/33561; H02M 3/33569; H02M 3/33576; H02M 2001/0054
USPC .......................................... 363/21.01–21.18
See application file for complete search history.

(56) References Cited

U.S. PATENT DOCUMENTS

| 9,118,259 | B2 | 8/2015 | Ye | |
| 9,178,437 | B2 * | 11/2015 | Rosado | H02M 1/40 |
| 9,853,557 | B2 * | 12/2017 | Hirano | H02M 3/33584 |
| 10,476,395 | B2 * | 11/2019 | Dai | H02M 7/53871 |
| 2014/0334189 | A1 | 11/2014 | Yan et al. | |
| 2016/0248343 | A1 * | 8/2016 | Garrity | H02J 3/383 |

OTHER PUBLICATIONS

F. Krismer et al, Modeling and Optimization of Bidirectional Dual Active Bridge DC-DC Converter Topologies, pp. 1-69, [online], retrieved from internet <URL: https://www.pes-publications.ee.ethz.ch/uploads/tx_ethpublications/Krismer_2011_03_17_Modeling_and_Optimization_of_Bidirectional_Dual_Active_Bridge_DC-DC_Converter_Topologies.pdf>.
M. H. Kheraluwala et al, Performance characterization of a high-power dual active bridge DC-to-DC converter, IEEE Transactions on Industry Applications, Dec. 1992, pp. 1294-1301, vol. 28, No. 6.
R. L. Steigerwald et al, A comparison of high-power DC-DC soft-switched converter topologies, IEEE Transactions on Industry Applications, Oct. 1996, pp. 1139-1145, vol. 32, No. 5.
R. W. A. A. De Doncker et al, A three-phase soft-switched high-power-density DC/DC converter for high-power applications, IEEE Transactions on Industry Applications, Feb. 1991, pp. 63-73, vol. 27, No. 1.
Iyer et al, Optimal Design Methodology for Dual Active Bridge Converter under Wide Voltage Variation, pp. 413-420.

* cited by examiner

*Primary Examiner* — Yemane Mehari

(57) ABSTRACT

In accordance with one embodiment, a system and method of controlling a direct current to direct current converter that comprises a primary full bridge coupled to a secondary full bridge via a transformer. After the start-up time period, an electronic data processor controls the converter to operate efficiently in a first control mode, a second control mode, or a third control mode, wherein the first control mode comprises a phase shift mode, the second control mode comprises a triangular waveform control mode and wherein the third control mode comprises a trapezoidal waveform control mode. The electronic data processor determines a maximum target power range and a transition power level threshold for each one of the control modes.

24 Claims, 8 Drawing Sheets

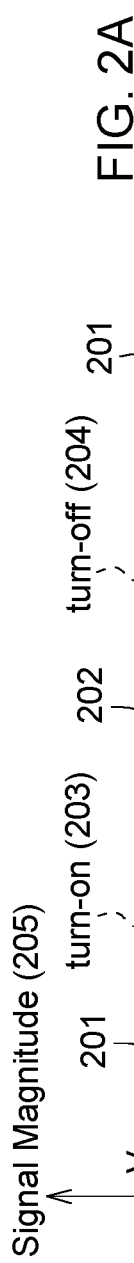
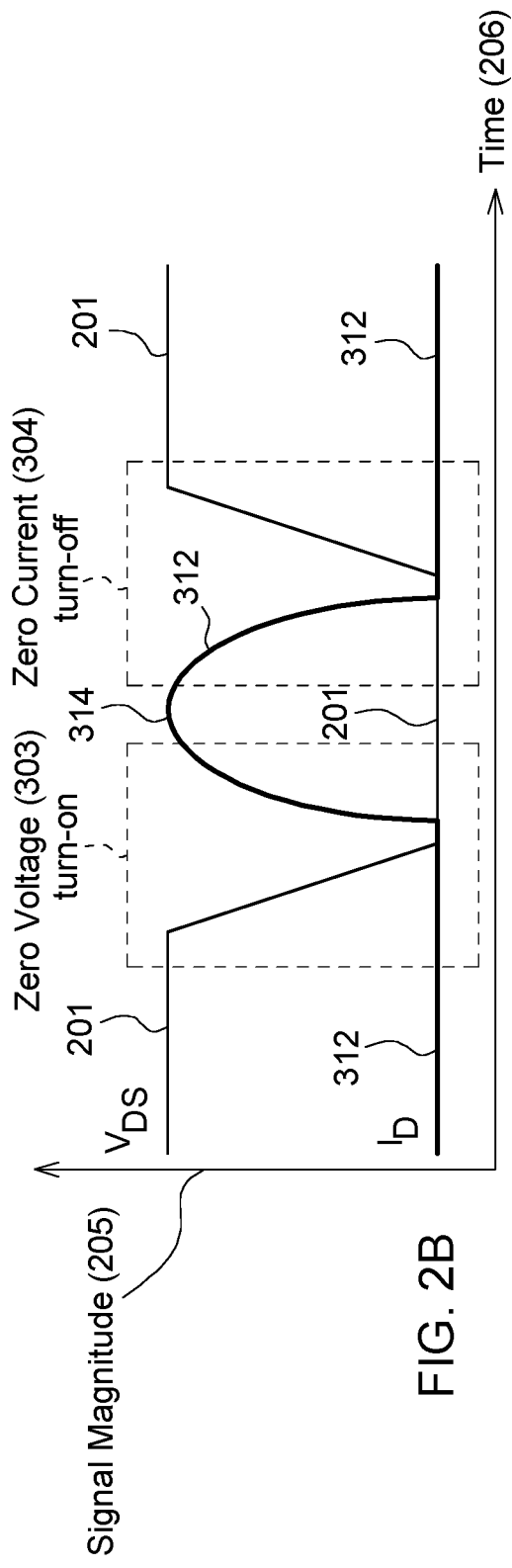

US 10,804,808 B1

METHOD AND SYSTEM FOR CONTROLLING SWITCHING OF A DIRECT CURRENT TO DIRECT CURRENT CONVERTER

FIELD

This disclosure relates to a method and system for controlling switching of a direct-current-to-direct-current converter.

BACKGROUND

In some prior art, a direct-current-to-direct-current converter is used to interface with or to convert direct (DC) bus voltages between a first voltage level and a second voltage level of DC voltage. For example, a primary full bridge is coupled to a secondary full bridge via a transformer, where the primary full bridge is associated with an energy storage device at the first voltage level and where the secondary full bridge is associated with a load at a second voltage level. If the switches in the primary full bridge or the secondary full bridge are operated in a phase shift modulation mode, the possible soft switching states are limited, such that the switches tend to produce greater heat than for triangular waveform modulation mode. Although the triangular waveform modulation mode has more possible soft switching states, the triangular waveform modulation mode may only have limited operating range. Accordingly, there is need for method and system for controlling efficient switching of direct current to a direct current converter that generates less thermal energy that the system operated primarily in the phase shift modulation mode.

SUMMARY

In accordance with one embodiment, a system and method of controlling a direct-current-to-direct-current converter that comprises a primary full bridge coupled to a secondary full bridge via a transformer. After a start-up time period, an electronic data processor controls the converter to operate efficiently in a first control mode, a second control mode, or a third control mode for each time interval in a succession of time intervals. For example, the first control mode comprises a phase shift mode; the second control mode comprises a triangular waveform control mode; the third control mode comprises a trapezoidal waveform control mode. The electronic data processor determines a maximum target power range and a transition power level threshold for each one of the control modes. The electronic data processor estimates the transition power level threshold based on: (a) reference loss data stored in a data storage device, the reference loss data based on predetermined or simulated converter switching losses and conduction losses associated with different control modes and/or (b) measurements of observed primary voltage and observed secondary voltage (e.g., alternating current voltage at the transformer winding terminals, or direct current voltage at the direct-current input and output terminals of the converter), applied to corresponding equations for one or more respective control modes. The electronic data processor manages the transition between or among the control modes based on the maximum target power range and the estimated power level threshold, wherein the control modes apply time-synchronized control signals to respective control terminals of primary switches in the primary full bridge and to secondary switches in the secondary full bridge.

BRIEF DESCRIPTION OF THE DRAWINGS

FIG. 2A is an illustrative graph of the drain-source voltage ($V_{DS}$) and the drain current ($I_D$) of a switch during a turn-on time window and a turn-off time window in accordance with a hard-switching event that is associated with a switching loss or thermal energy.

FIG. 2B is an illustrative graph of the drain-source voltage ($V_{DS}$) and the drain current ($I_D$) of a switch during a soft turn-on time window and soft turn-off time window.

DESCRIPTION OF THE PREFERRED EMBODIMENTS

In any of the above referenced drawings of this document, any arrow or line that connects any blocks, components, modules, multiplexers, sensors, switches, diodes, memory, data storage, data processors, electronic components, oscillators, or other electronic or software modules may comprise one or more of the following items: a physical path of electrical signals, a physical path of an electromagnetic signal, a logical path for data, one or more data buses, a circuit board trace, a transmission line; a link, call, communication, or data message between software modules, programs, data, or components; or transmission or reception of data messages, software instructions, modules, subroutines or components.

In one embodiment, the system and method disclosed in this document may comprise a computer-implemented system, method or converter in which one or more data processors process, store, retrieve, and otherwise manipulate data via data buses and one or more data storage devices (e.g., data storage device or memory) as described in this document and the accompanying drawings. As used in this document, "configured to, adapted to, or arranged to" mean that the data processor, converter or controller is programmed with suitable software instructions, software modules, executable code, data libraries, and/or requisite data to execute any referenced functions, mathematical operations, logical operations, calculations, determinations, processes, methods, algorithms, subroutines, or programs that are associated with one or more blocks set forth in any other drawing in this disclosure. Alternately, separately from or cumulatively with the above definition, "configured to, adapted to, or arranged to" can mean that the converter comprises one or more components described herein as software modules, equivalent electronic hardware modules, or both to execute any referenced functions, logic operations, mathematical operations, calculations, determinations, processes, methods, algorithms, subroutine.

Figure 1A:
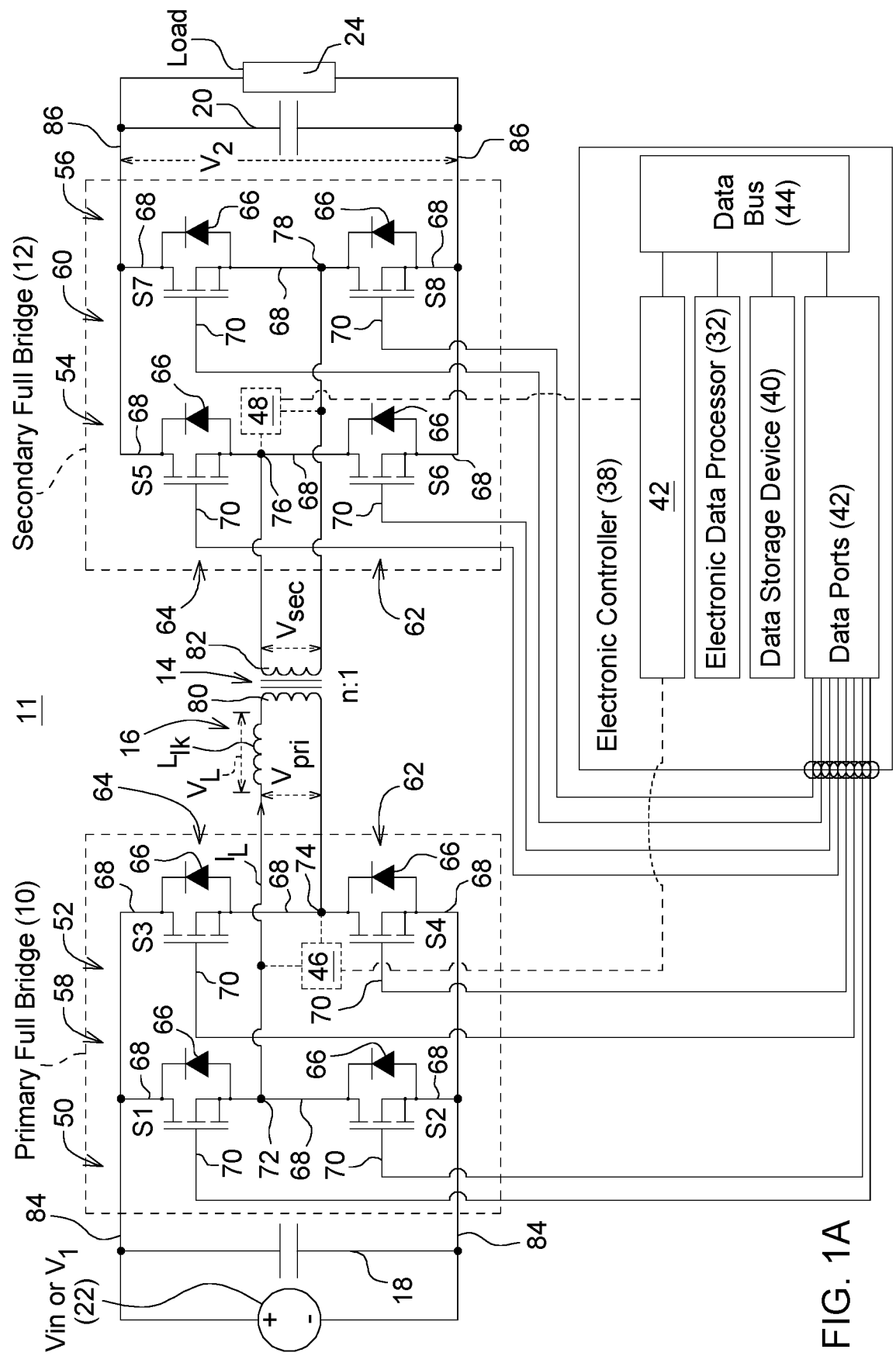
FIG. 1A is a schematic diagram of one embodiment of a direct-current-to-direct-current-converter that comprises a primary full bridge coupled to a secondary full bridge via a transformer.

FIG. 1A is a schematic diagram of one embodiment of a direct-current-to-direct-current converter 11 (DC-to-DC converter) that comprises a primary full bridge 10 coupled to a secondary full bridge 12 via a transformer 14. A primary full bridge 10 comprises first pair 50 of primary switches and a second pair 52 of primary switches. The first pair 50 of primary switches is coupled between direct current (DC) primary terminals 84 (e.g., input terminals) of the primary full bridge 10; the second pair 52 of primary switches 58 is coupled between DC primary terminals 84 (e.g., input terminals) of the primary full bridge 10.

In one embodiment, the DC-to-DC converter 11 comprises a single phase, dual-active bridge DC-to-DC converter with DC primary terminals 84 (e.g., DC input terminals) at the primary full bridge 10 and DC secondary terminals 86 (e.g., DC output terminals) at the secondary full bridge 12, where the DC-to-DC converter may operate unidirectionally or bidirectionally.

Each pair of primary switches 58 comprises a low-side switch 62 and a high-side switch 64. Similarly, each pair of secondary switches 60 comprises a low-side switch 62 and a high-side switch 64. Each switch (58, 60) has switched terminals 68 that are controlled by a control terminal 70. For example, if the switch is a field effect transistor, such as a metal oxide semiconductor field effect transistor (MOSFET), the switched terminals 68 comprise a source and drain terminal and the control terminal 70 comprises a gate terminal. In one configuration, for each pair of primary switches 58, the switched terminals 68 of the low-side switch 62 are coupled in series to the switched terminals 68 of the high-side switch 64 between the DC primary terminals 84. As illustrated in FIG. 1A, each switch has a protective diode 66 coupled in parallel to the switched terminals 68 of the respective switch. In one embodiment, the switches (58, 60) may comprise silicon carbide field effect transistors or other semiconductor devices.

In the primary full bridge 10, the switched terminals 68 of the first pair 50 of low-side switch 62 and the high-side switch 64 are coupled together at a first node 72 or first junction associated with a primary alternating current signal. In the primary full bridge 10, the switched terminals 68 of the second pair 52 of low-side switch 62 and the high-side switch 64 are coupled together at a second node 74 or second junction associated with the primary alternating current signal.

A secondary full bridge 12 comprises a third pair 54 of switches (e.g., secondary switches 60) and a fourth pair 56 of switches (e.g., secondary switches 60) coupled between DC secondary terminals 86 (e.g., output terminals) of the secondary full bridge 12. The third pair 54 of switches (e.g., secondary switches 60) is coupled between direct current secondary terminals (e.g., output terminals) of the secondary full bridge 12; the fourth pair 56 of switches (e.g., secondary switches 60) is coupled between DC secondary terminals 86 (e.g., output terminals) of the secondary full bridge 12.

Each pair of secondary switches 60 comprises a low-side switch 62 and a high side switch 64. Each secondary switch 60 has switched terminals 68 that are controlled by a control terminal 70. For example, if the switch is a field effect transistor, such as a metal oxide semiconductor field effect transistor (MOSFET), the switched terminals 68 comprise a source and drain terminal and the control terminal 70 comprises a gate terminal. As illustrated in FIG. 1A, each secondary switch 60 has a protective diode 66 coupled in parallel to the switched terminals 68 of the respective switch.

In the DC-to-DC converter 11 in one illustrative configuration, each diode 66 facilitates current dissipation associated with the respective switch (58, 60), to which the diode 66 is coupled in parallel, to reduce transient voltages across the switch (e.g., during a prior turn-off, prior deactivation or prior dead-time of the switch in preparation) for the next turning on of the switch, or next activating of the switch (58, 60). In one embodiment, the protective diodes 66 may be composed gallium nitride diodes or other semiconductor materials.

In the secondary full bridge 12, the switched terminals 68 of the third pair 54 of low-side switch 62 and the high-side switch 64 are coupled together at a third node 76 or third junction associated with a secondary alternating current signal. In the secondary full bridge 12, the switched terminals 68 of the fourth pair 56 of low-side switch 62 and the high-side switch 64 are coupled together at a fourth node 78 or fourth junction associated with the secondary alternating current signal.

In one embodiment, a transformer 14 is coupled between the primary full bridge 10 and the secondary full bridge 12. For example, a primary winding 80 of the transformer 14 is coupled to a first node 72 (e.g., first output terminal) of the first pair 50 and the second node 74 (e.g., second output terminal) of second pair 52 of primary switches 58. Similarly, a secondary winding 82 of the transformer 14 is coupled to a third node 76 (e.g., third output terminal) of the third pair 54 and a fourth node 78 (e.g., fourth output terminal) of the fourth pair 56 of switches (e.g., secondary switches 60).

The transformer 14 has a primary winding 80 and a secondary winding 82, where a transformer 14 ratio (n) represents a voltage ratio between the primary terminals and the secondary terminals. For example, the primary winding 80 ratio may represent the number of relative turns (n) of the primary winding 80 to the secondary winding 82. The voltage ratio or winding ratio may depend upon the winding configuration, the conductor configuration, and the configuration of any core, such as ferromagnetic core, a ferrite core, or an iron core.

An energy source 22 (e.g., battery, capacitor, or generator output) is coupled to the direct current (DC) primary terminals 84 (e.g., input terminals). A load 24 is configured to be coupled to the direct current (DC) secondary terminals 86 (e.g., output terminals). However, the DC-to-DC converter 11 that comprises the primary full bridge 10, the secondary full bridge 12 and the transformer 14 can operate bi-directionally, such as where the electrical energy is transferred in either direction between the DC primary terminals 84 and the DC secondary terminals 86. In one direction, the energy source 22 at the DC primary terminals 84 can power a load 24 at the DC secondary terminals 86. However, in the opposite direction, the load 24 at the DC secondary terminals 86 can provide excess or transient energy to the DC primary terminals 84 to charge the energy source 22. As illustrated, a capacitor, such as a primary capacitor 18 is placed across the DC primary terminals 84 and a secondary capacitor 20 is placed across the DC secondary terminals 86, where the primary capacitor 18 and the secondary capacitor 20 are used for filtering (e.g., to reduce noise, such as current ripple or voltage ripple n the DC voltage).

In certain embodiments, the DC primary terminals 84 are configured to operate at a different voltage level than the DC secondary terminals 86. In other embodiments, the DC primary terminals 84, the DC secondary voltage levels can have variable voltage levels that can fluctuate with the load 24 or operating conditions on a dynamic basis for each time interval (e.g., sampling time of DC voltage observed at the DC primary input and DC secondary output terminals of the converter). For example, the DC primary terminals 84 operate at a higher voltage level or higher voltage range (e.g., approximately 400 VDC to approximately 800 VDC) than a lower voltage level or lower voltage range (e.g., approximately 12 VDC to approximately 400 VDC) the DC secondary terminals 86. Accordingly, the electronic assembly or DC-to-DC converter 11 supports a vehicle with different DC bus levels that are isolated from each other because the transformer blocks DC energy from passing through between transformer primary and transformer secondary.

In one embodiment, an electronic data processor 32, such as an electronic controller 38, is configured to provide time-synchronized control signals to the control terminals 70 of the primary switches 58 and secondary switches 60 to control the converter 11 to operate efficiently in a first control mode 26, a second control mode 28, or a third control mode 30 (in FIG. 7), wherein the first control mode 26 comprises a phase-shift mode, the second control mode 28 comprises a triangular waveform control mode and wherein the third control mode 30 comprises a trapezoidal waveform control mode.

In one embodiment, an electronic controller 38 comprises an electronic data processor 32, a data storage device 40, and one or more data ports 42 coupled to or in communication with a data bus 44. The electronic data processor 32, the data storage device 40, and one or more data ports 42 may communicate data messages between each other via the data bus 44.

The electronic data processor 32 comprises a microcontroller, a microprocessor, a programmable logic array, a logic device, an arithmetic logic unit, a digital signal processor, an application specific integrated circuit or another device for processing or manipulating data. The data storage device 40 comprises electronic memory, nonvolatile random-access memory, magnetic storage device, an optical storage device, or another device for storing, retrieving and managing data, files, data structures or data records. The data ports 42 may comprise an input/output port, a data transceiver, a wireline transceiver, a wireless transceiver, buffer memory, or a combination of the foregoing items.

The electronic data processor 32 or its data ports 42 are connected to or in communication with the control terminals 70 of the switches (e.g., primary switches 58 and the secondary switches 60) of the primary full bridge 10 and the secondary full bridge 12. Accordingly, the electronic controller 38 can control the timing and operation of each switch, such as activation time, deactivation time, biasing and other aspects. In one embodiment, the electronic controller 38 or electronic data processor 32 uses a fixed switching frequency of fundamental frequency (e.g., within an operational range of switching frequencies) of the switches for multiple or all modulation modes, such as the first mode, the second mode and the third mode. Further, the switches can operate with a same or substantially similar fixed duty cycle (e.g., 50 percent duty cycle plus or minus ten percent tolerance) for multiple or all modulation modes, such as the first mode, the second mode and the third mode. In some configurations, the peak magnitude and duration of the gate signal of the high-side switch 64 and low-side switch 62 of any pair or phase will generally be equal or substantially equivalent. In one configuration, the electronic data processor 32 or electronic controller 38 is configured to determine a maximum target power range 34 and a transition power level threshold for each one of the control modes.

In one embodiment, the electronic data processor 32 or electronic controller 38 is configured for one or more of the following: (a) to determine one or more transition power level thresholds at runtime, (b) to select an optimal control mode among the control modes to reduce or minimize switching losses, and (c) and to select an optical control mode among the control modes to provide maximum soft switching of the primary switches and the secondary switches. For example, the maximum target power range 34 has an upper limit that is equal to, proportional to or commensurate with a transferred power equation that corresponds to the respective control mode. Although the DC primary terminals 84 (e.g., DC primary bus) and the DC secondary terminals 86 (e.g., DC secondary bus) have fixed voltage levels, the primary voltage ($V_1$) at (or across) the transformer primary winding 80, or the secondary voltage ($V_2$) at (or across) the transformer secondary winding 82, or both can vary.

In one embodiment, a first voltage sensor 46 (e.g., primary voltage sensor) is configured to measure the primary voltage (e.g., root-mean-squared voltage, peak voltage or other alternating current voltage measurement) and a second voltage sensor 48 (e.g., secondary voltage sensor) is configured to: (a) measure the observed primary and secondary voltages (e.g., root-mean-squared voltage, peak voltage or other alternating current voltage measurement) and (b) provide the measurements observed voltage readings of the primary voltage and secondary voltage (e.g., at the transformer terminals of the primary winding and secondary winding) to the electronic controller 38 via one or more data ports 42. In another embodiment, the first voltage sensor 46 and the second voltage sensor 48 may measure one or more of the following: alternating current (AC) voltage levels, root-mean-squared (RMS) voltage levels, or rectified alternating current (e.g., via a half-wave or full-wave bridge rectifier) at one or more transformer windings (80, 82). Further, the electronic controller 38 or electronic data processor 32 is configured to estimate the DC primary voltage at the DC primary input terminals 84 and the DC secondary voltage at the DC secondary output terminals 86 of the converter 11 based on the measurements, or can control the switches in an initialization mode or test mode to facilitate direct measurement of the primary voltage at the DC primary input terminals 84 and the secondary voltage at the DC secondary output terminals 86 of the converter.

Alternately, (e.g., during initialization mode or operational mode) the first voltage sensor 146 (in FIG. 1B) and the second voltage sensor 148 (in FIG. 1B) are configured to: (a) measure the primary voltage at the DC primary input terminals 84 and the secondary voltage at the DC secondary output terminals 86 of the converter 11, and (b) provide the measurements to the electronic controller 38 via one or more data ports 42. Accordingly, the observed primary voltage and the observed secondary voltage can be or are applied to one or more transferred power equations that apply to the respective control mode to estimate the maximum transferred power for each control mode; hence, establish the limits (e.g., upper limit), corresponding operational ranges, or corresponding operating regions for each respective control mode.

Figure 7:
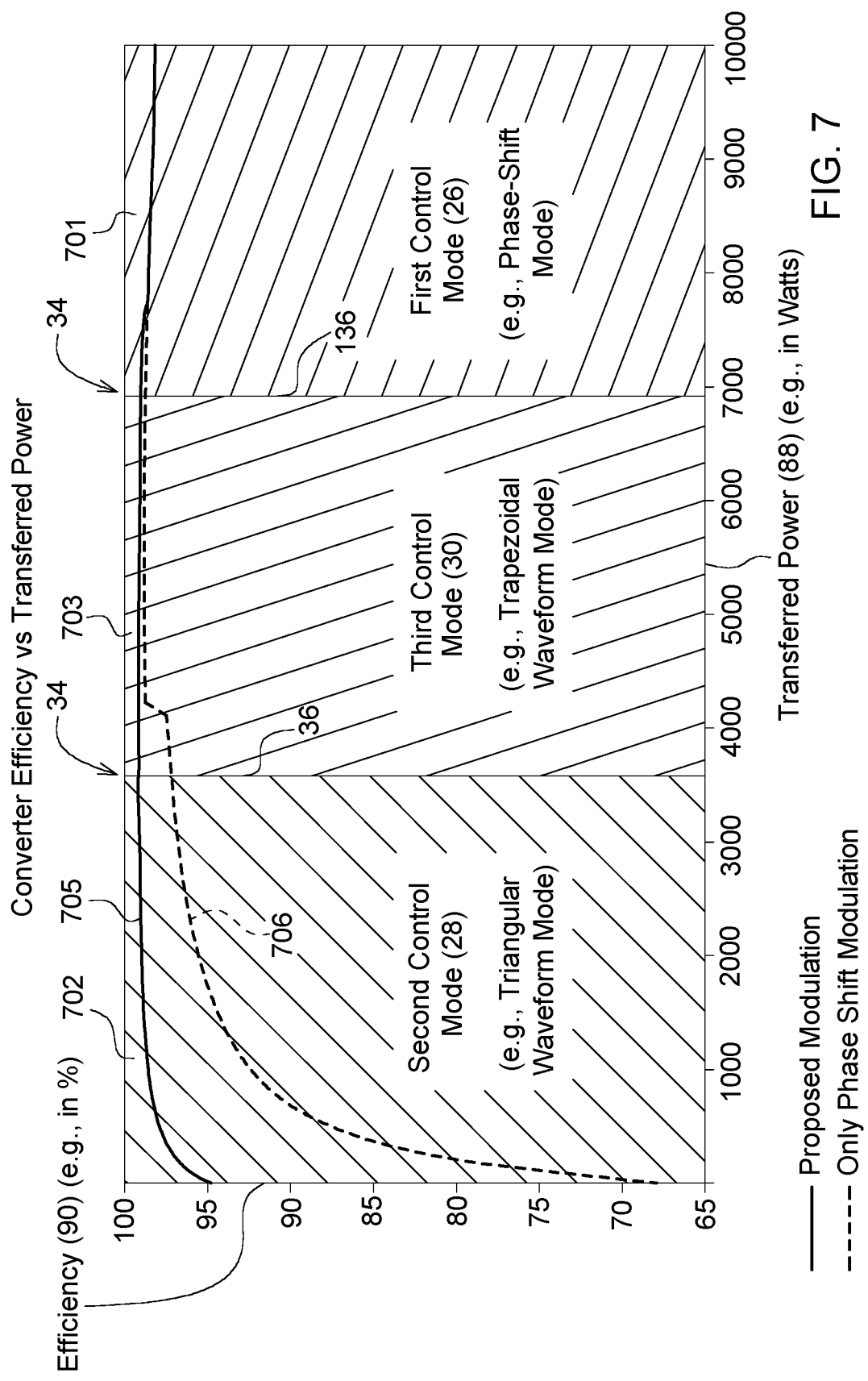
FIG. 7 is an illustrative graph of operational modes associated with efficiency and transferred power to a load.

As illustrated in FIG. 7, the upper limit of a control mode may be established to be coextensive with a lower limit of an adjacent control mode. For example, the upper limit at a transition power threshold 36 of the second mode 28 (e.g., triangular waveform control mode) is coextensive with a lower limit the same transition power threshold 36 of the third control mode 30 (e.g., trapezoidal waveform control mode); the upper limit at a transition power threshold 136 of the third control mode 30 is coextensive with a lower limit at the same transition power threshold 136 of the first control mode 26.

In one embodiment, cumulative with the transferred power equations or independently from the transferred power equations for each respective mode, the electronic controller 38 is configured to estimate one or more transition power level thresholds (36, 136) (e.g., at runtime or online) based on reference loss data (e.g., thermal energy loss data) stored in a data storage device 40. For example, reference loss data is based on a predetermined or simulated (e.g., offline) DC-to-DC converter model switching losses and conduction losses associated with different control modes. The electronic data processor 32 or the electronic controller 38 is configured to manage the transition between or among the control modes based on the maximum target power range 34 and the estimated transition power threshold (e.g., transition level).

Figure 1B:
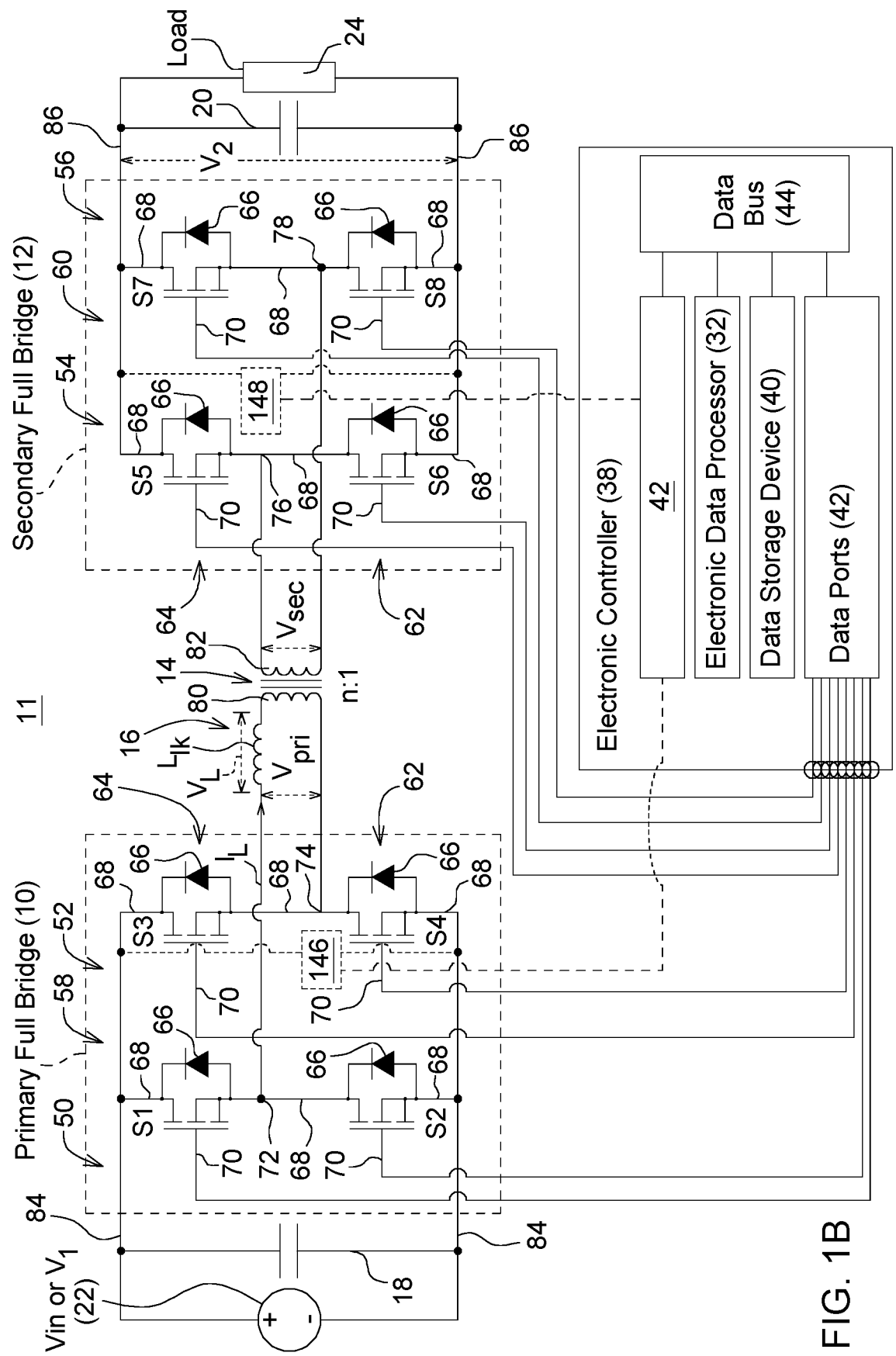
FIG. 1B is a schematic diagram of another embodiment of a direct-current-to-direct-current-converter that comprises a primary full bridge coupled to a secondary full bridge via a transformer.

FIG. 1A is similar to FIG. 1B, except the first voltage sensor 46 and the second voltage sensor 48 of FIG. 1A are replaced by the first voltage sensor 146 and the second voltage sensor 148 of FIG. 1B. For example, the readings by a first voltage sensor 146 and a second voltage sensor 148 can be applied to the equations set forth in this document that call for the DC primary voltage ($V_1$) at terminals 84 or DC secondary voltage ($V_2$) at terminals 86. In an alternate embodiment, the first voltage sensor 146 or the second voltage sensor 148 may be omitted if the DC primary voltage ($V_1$) is fixed or regulated within a certain tolerance and the second voltage sensor 148 may be omitted if the DC secondary voltage ($V_2$) is fixed or regulated within a certain tolerance.

FIG. 2A is an illustrative graph of a potential drain-source voltage (or collector-emitter voltage) and the drain current (or base current) of a switch during turn-on and turn-off in accordance with a possible hard-switching event that is associated with a switching loss (e.g., less efficiency of the DC-to-DC converter 11) or thermal energy. In FIG. 2A, the vertical axis indicates signal magnitude 205 and the horizontal axis indicates time 206. The drain-source voltage 201 ($V_{DS}$) is the voltage measured across or between the switched terminals 68 of the switch, such as the drain and the source, or the collector and emitter, respectively. The drain current 202 ($I_D$) is shown simultaneously with respect to the drain-source voltage 201.

During a turn-on window 203 or activation of the switch, the possible switching loss is indicated by the left cross-hatched triangular region 207 in FIG. 2A. During turn-off window 204 or deactivation of the switch, the possible switching loss is indicated by the right-cross hatched region 207. The loss associated with possible hard-switching events generally increases with an increase in switching frequency and voltage, such as the drain-source voltage of the switch. Although hard-switching events may occur in any switching mode, there is a greater probability of hard-switching events occurring with the first control mode 26 or phase shifting mode of operation of the switches of the DC-to-DC converter 11.

FIG. 2B is an illustrative graph of the drain-source voltage ($V_{DS}$) 201 and the drain current ($I_D$) 312 of a switch during a soft turn-on window 303 (e.g. zero voltage turn-on window) and soft turn-off window 304 (e.g., zero current turn-off window). In FIG. 2B the vertical axis indicates signal magnitude 205 and the horizontal axis indicates time 206. The drain-source voltage 201 ($V_{DS}$) is the voltage measured across or between the switched terminals 68 of the switch, such as the drain and the source, or the collector and emitter, respectively. The drain current 312 ($I_D$) is shown simultaneously with respect to the drain-source voltage 201, where the drain current 312 has a peak magnitude 314 between the soft turn-on window 303 and the soft turn-off window 304 and an arched shape or steep decline from the peak magnitude to avoid drain current 312 flowing during soft turn-on window 303 and the soft turn-off window 304.

During soft turn-on window 303 or activation of the switch, if there is no overlap between the drain-source voltage 201 and the drain current 312, possible soft switching is indicated by the left region of zero voltage turn-on in FIG. 2B. During a soft turn-off window 304 or deactivation of the switch if there is no overlap between the drain-source voltage 201 and the drain current 312, the possible switching loss is indicated by the right region of zero-current turn-off. In other words, during the possible soft switching events of FIG. 2B, the switch has zero drain-source voltage 201 or drain-source voltage 201 approaching zero to minimize loss. Further, the soft switching events are associated with one or more of the following: (a) potentially increased efficiency and potentially increased power density of the DC-to-DC converter 11, (b) potentially reduced electromagnetic radiation or interference generated by the switch, and (c) potentially greater longevity of the switch (e.g., semiconductor switch) associated with reduced thermal stress; hence, potentially greater longevity of the DC-to-DC converter 11.

Figure 3:
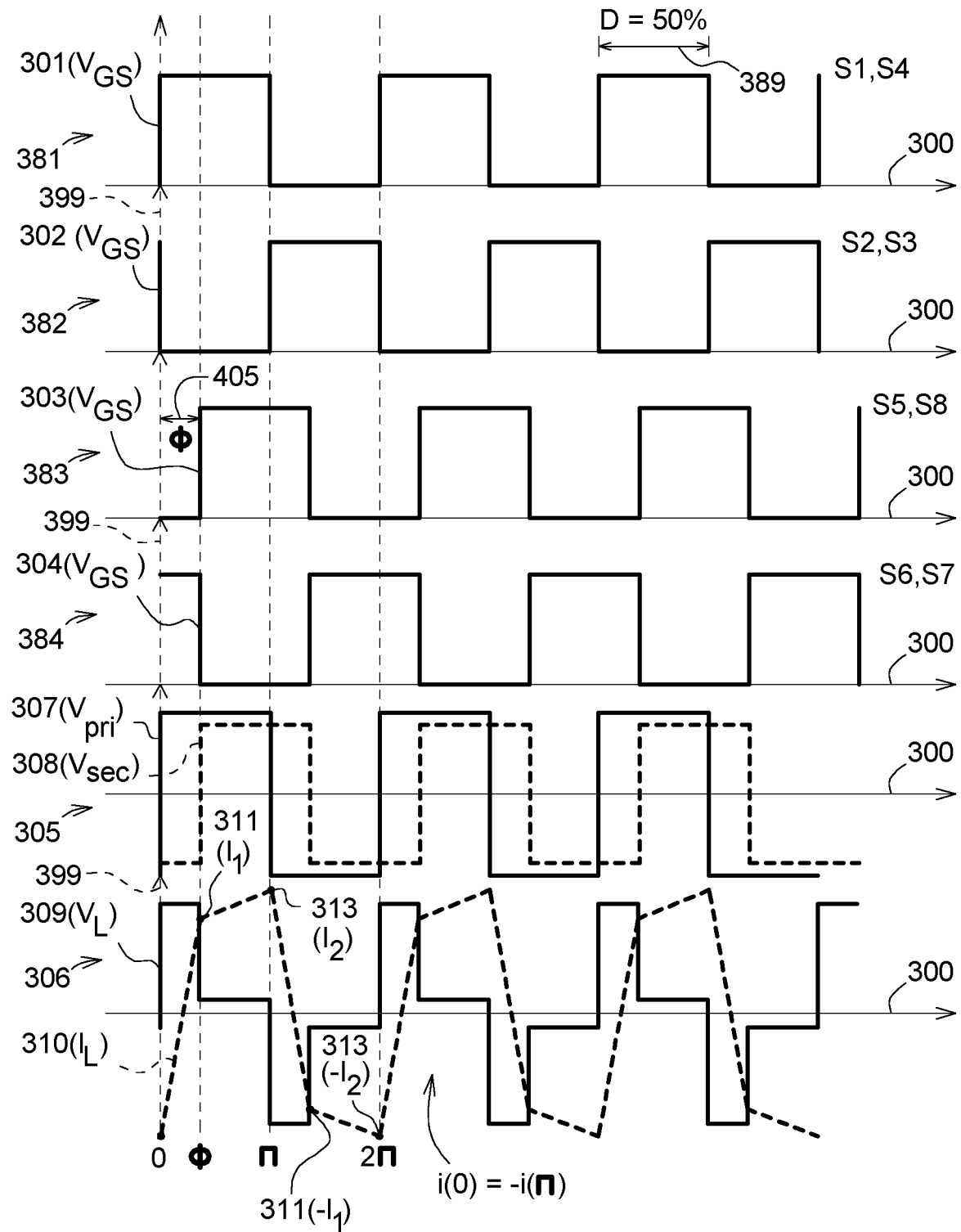
FIG. 3 is an illustrative graph of possible gate input voltage (e.g., $V_{GS}$) or base input voltage versus time of the switches in the converter for a first mode (e.g., phase shift mode) and the associated primary voltage, secondary voltage, inductor voltage and inductor current for the converter assembly operating in the first mode.

FIG. 3 is an illustrative graph of possible gate input voltage ($V_{GS}$) or base input voltage versus time of the switches in the converter 11 for a first control mode 26 (e.g., phase shift mode) and the associated primary voltage 307 ($V_{pri}$), secondary voltage 308 ($V_{sec}$), inductor voltage 309 ($V_L$) and inductor current 310 ($I_L$) for the converter 11 operating in the first control mode 26. In one embodiment, the root-mean-squared value of the alternating current (AC) primary voltage ($V_{pri}$) and secondary voltage ($V_{sec}$) are proportional to or derivative of the primary input voltage ($V_1$) and the secondary output voltage ($V_2$), respectively.

In the first control mode 26 or phase shift mode, the DC-to-DC converter 11 can be operated in any power level that is at or below its maximum operating power level. Although the soft-switching events, such as zero-voltage switching (ZVS) or zero-current switching (ZCS), can be realized in the first control mode 26, soft-switching events depend on the load 24, and its electrical characteristics (e.g., resistance, reluctance, inductance, and capacitance), and/or the relative values of the first current ($I_1$) in the primary windings 80 and the second current ($I_2$) in the primary windings 80.

The currents that flow through both the primary winding 80 and secondary winding 82 of the transformer 14 have same shape waveforms with different magnitude. The current levels ($I_1$ and $I_2$) determine the soft-switching events. For example, when $I_1>0$ and $I_2>0$, both primary and secondary switches are ZVS turn-on/turn-off. When $I_1<0$ and $I_2>0$, only primary switches are ZVS turn-on/turn-off. The voltage 309 ($V_L$), which is indicated by the solid line in bottom graph 306, is the voltage across the inductor 16 (L), which can be estimated according to the following equation in some embodiments:

$V_L = V_{pri} - nV_{sec}$, where $V_L$ is the voltage across inductor 16 or model inductance of the primary winding 80 of transformer 14; $V_{pri}$ is the primary voltage across the primary winding 80 of the transformer and the inductor 16, $V_{sec}$ is the secondary voltage across the secondary winding 82 of the transformer 14 and n is a ratio of turns of the primary winding 80 to the secondary winding 82.

The inductor current 310 ($I_L$), which is indicated by the dashed line in bottom graph 306, can be estimated according to the following equation:

$I_L = 1/L \int_0^t V_L$, where $V_L$ is the voltage across inductor 16 or model inductance of the primary winding 80 of transformer 14; where $I_L$ is the current flowing through the inductor 16, where L is the value of the inductance of inductor 16, and where t is the time associated with charging or discharging inductor 16.

The controller 38 can control the primary current and secondary current in accordance with various examples, which may be applied cumulatively or secondarily, to achieve soft-switching states, where possible, in the first control mode 26. In a first example, the load 24 can influence or induce, at least partially, the first current level 311 ($I_1$) and the second current level 313 within the primary winding 80 of the transformer. In FIG. 3, the current 310 ($I_L$) is the current flow through the inductor 16 or model inductance associated with the primary winding 80 of the transformer 14.

In a second example in the first control mode 26, if the drain current 202 ($I_D$) is greater than zero during turn-on state (e.g., turn-on window 203) or turn-off state (e.g., turn-off window 204) of the switch because of the load-induced current in the inductive transformer 14 windings (e.g., $I_1$ or $I_2$ in the primary winding 80) and/or because of load 24 with inductive characteristics, then hard-switching events may occur, such as during the first control mode 26. For example, the load-induced current has a current waveform $I_L$, where $I_1$ and $I_2$ are two points in the same current waveform $I_L$ (e.g., inductor 16 or transformer primary-side current waveform).

In a third example in the first control mode 26, hard-switching events (e.g. non-ZVS) may occur in the primary switches 58 of the primary full bridge 10 if the first current level ($I_1$) is greater than zero and if the second current level ($I_2$) is less than zero. In a fourth example in the first control mode 26, hard-switching events (e.g., non-ZVS) may occur in the secondary switches 60 of the secondary full bridge 12 if the first current level ($I_1$) is less than zero and if the second current level ($I_2$) is greater than zero. In a fifth example in the first control mode 26, soft switching events (e.g., ZVS) may occur if both the first current level ($I_1$) and the second current level ($I_2$) are greater than zero.

In the first control mode 26, the conduction through the diode 66 during dead time or after turn-off window (204, 304) reduces the drain-source voltage ($V_{DS}$) to support ZVS during soft turn-on window 303 of any switches in the first control mode 26. However, in the first control mode 26, if the switch is turned off or deactivated, the turn-off window 204 is a hard-switching event.

In the first control mode 26, the maximum achievable power transfer is realized when the phase offset is approximately 180 degrees between the primary full bridge 10 and the secondary full bridge 12 in accordance with the following equation:

$$P_{PS,max} = \frac{n \cdot V_1 \cdot V_2}{8 f_s L};$$

where n is the transformer ratio, of transformer 14, between the primary winding 80 and the secondary winding 82; $V_1$ is input DC voltage to the primary full bridge 10 at the DC primary terminals 84, such as the input voltage provided by energy source 22; $V_2$ is the output DC voltage of the secondary full bridge 12 associated with DC secondary terminals 86; $f_s$ is the switching frequency of the switches (58, 60); and L is the transformer inductance modeled as a model inductance 16 in series with the primary winding 80 of the transformer 14.

In the first control mode 26, the phase offset, $\phi$, between the primary full bridge 10 and the secondary full bridge 12 (e.g., between switch S1 and switch S5) is variable and adjusted based on the transferred power that is required from the DC-to-DC converter 11 in accordance with the following equation:

$$\phi = \frac{\pi}{2}\left[1 - \sqrt{1 - \frac{8f_s L |P|}{n V_1 V_2}}\right],$$

where n is the transformer ratio, of transformer 14, between the primary winding 80 and the secondary winding 82, $V_1$ is input DC voltage to the primary full bridge 10 at the DC primary terminals 84, such as the input voltage provided by energy source 22; $V_2$ is the output DC voltage of the secondary full bridge 12 associated with DC secondary terminals 86; $f_s$ is the switching frequency of the switches, L is the inductance modeled as a model inductance 16 in series with the primary winding 80 of the transformer 14, and P is the transferred power of the DC-to-DC converter 11.

Referring to FIG. 1A and FIG. 3, in the first control mode 26 the primary switches 58 comprise a first pair 50 (S1, S2) of switches for a first phase (e.g., first leg) and second pair 52 (S3, S4) of switches for a second phase (e.g., second leg). As illustrated in FIG. 3, in the first control mode 26 a high-side switch 64 (S1) of the first pair 50 has complementary phase offset (e.g., approximately 180 degrees offset) with respect to the high-side switch 64 (S3) of the second pair 52; the low side switch (S2) of the first pair 50 has complementary phase offset (e.g., approximately 180 degrees offset) with respect to the low-side switch 62 (S4) of the second pair 52. Similarly, in the first control mode 26 the secondary switches 60 comprise a third pair 54 (S5, S6) of switches for a third phase (e.g., third leg) and fourth pair 56 (S7, S8) of switches for a fourth phase (e.g., fourth leg). As illustrated in FIG. 3, in the first control mode 26 the high-side switch 64 (S5) of the third pair 54 has a complementary phase offset (e.g., approximately 180 degrees offset) with respect to the high-side switch 64 (S7) of the fourth pair 56; the low-side switch (S6) of the third pair 54 has complementary phase offset (e.g., approximately 180 degrees offset) with respect to the low-side switch 62 (S8) of the fourth pair 56.

Further in FIG. 3, the primary switches 58 comprise a first pair 50 of switches for a first phase and second pair 52 of switches for a second phase; in the first control mode 26 within each of the first pair 50 and the second pair 52 the primary switches a high-side switch 64 has a complementary phase offset with respect to a low-side switch 62 and approximately fifty percent duty cycle. A fifty percent duty cycle means the low-side switch 62 or the high-side switch 64 within a pair is active or turned-on approximately one-half of the time, where approximately means a tolerance of plus or minus ten percent about the fifty percent duty cycle. Similarly, the secondary switches 60 comprise a third pair 54 of switches for a third phase and fourth pair 56 of switches for a fourth phase; in the first control mode 26 within each of the third pair 54 and the fourth pair 56 the primary switches 58 a high-side switch 64 has a complementary phase offset with respect to a low-side switch 62 and approximately fifty percent duty cycle.

FIG. 3 illustrates multiple control signals applied to control terminals 70 of the switches (58, 60) in the DC-to-DC converter 11 in the upper four graphs. The penultimate graph (305) shows respective primary voltage 307 ($V_{pri}$) in solid lines and secondary voltage 308 ($V_{sec}$) across the transformer 14 of the DC-to-DC converter 11. The last or bottom graph (306) shows the inductor voltage 309 ($V_L$) and inductor current 310 ($I_L$) of the inductor 16 ($L_{lk}$) or inductance associated with the primary winding of the transformer 14. For all of the graphs of FIG. 3, there is a common time scale along each horizontal axis 300 and separate signal magnitudes for each signal along each vertical axis 399, which are illustrated in dashed lines that terminate in upward pointing arrows. The relative phase shift ϕ (e.g., a maximum phase shift of approximately 180 degrees, where the relative phase shift ϕ is adjustable to reduce switching losses) between the control signals of ones of the switches, such as primary switches 58 and secondary switches 60, are illustrated in FIG. 3. Meanwhile, the control signals (301, 302, 303, 304) are illustrated with a duty-cycle 389 (D) of approximately fifty (50) percent.

In FIG. 3, in the uppermost graph 381 the first control signal 301 is applied to the high-side switch 64 (S1) of the first pair 50 of primary switches 58 and the low-side switch 62 (S4) of the second pair 52 of the primary switches 58. For example, if each switch is a field effect transistor (FET), then control signal is applied as a control voltage or gate-source voltage ($V_{GS}$).

In the second uppermost graph 382, the second control signal 302 is applied to the low-side switch 62 (S2) of the first pair 50 of primary switches 58 and the high-side switch 64 (S3) of the second pair 52 of the primary switches 58. For example, if each switch is a field effect transistor (FET), then control signal is applied as a control voltage or gate-source voltage ($V_{GS}$).

In FIG. 3, in the third uppermost graph 383 the third control signal 303 is applied to the high-side switch 64 (S5) of the third pair 54 of switches (e.g., secondary switches 60) and the low-side switch 62 (S8) of the fourth pair 56 of the switches (e.g., secondary switches 60). For example, if each switch is a field effect transistor (FET), then control signal is applied as a control voltage or gate-source voltage (VGS).

In the fourth uppermost graph 384, the fourth control signal 304 is applied to the low-side switch 62 (S6) of the third pair 54 of switches (e.g., secondary switches 60) and the high-side switch 64 (S7) of the second pair 52 of the switches (e.g., secondary switches 60). For example, if each switch is a field effect transistor (FET), then control signal is applied as a control voltage or gate-source voltage (VGS).

In the penultimate graph 305, the relative phase shift ϕ (e.g., a maximum phase shift of approximately 180 degrees, where the relative phase shift ϕ is adjustable to reduce switching loss) between the primary voltage 307 of the transformer 14 and the secondary voltage 308 of the transformer 14 is shown. The primary voltage 307 is indicated as a solid line, whereas the secondary voltage 308 is indicated as a dashed line in the penultimate graph 305 of FIG. 3.

In the last graph 306 or bottom graph of FIG. 3, a signal output waveform is associated with the load 24 while the DC-to-DC converter 11 operates in the first control mode 26. The inductor voltage 309 (e.g., across the inductor terminals of inductor 16 or associated with model inductance) is indicated by the solid line, whereas the inductor current 310 is indicated by the dashed line in the last graph of FIG. 3.

Figure 4B:
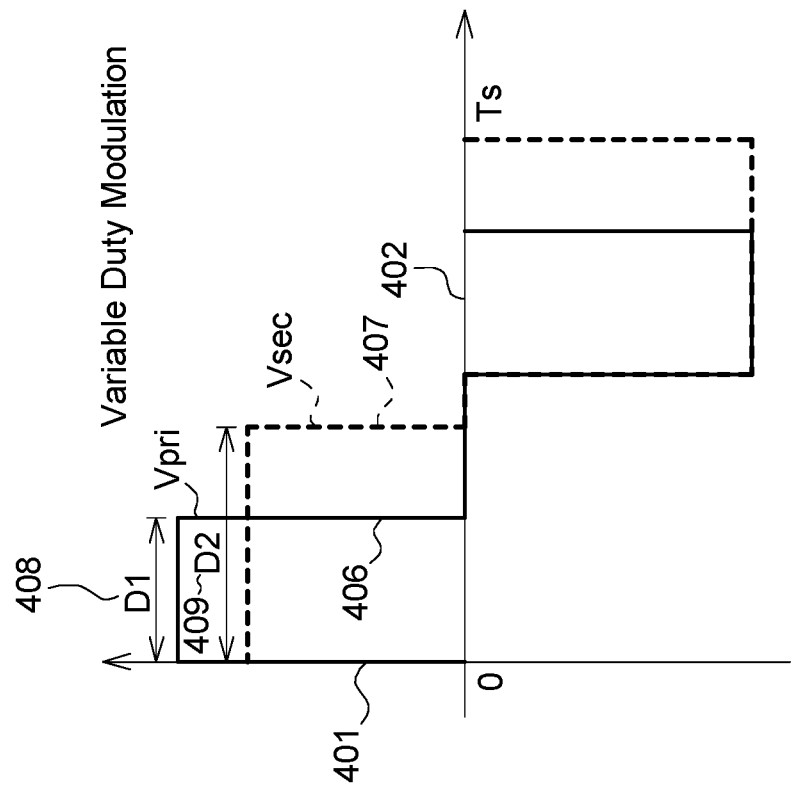
FIG. 4B is an illustrative graph of possible primary voltage and secondary voltage versus time for a variable duty modulation or duty cycle (e.g., as observed at the transformer windings).
Figure 4A:
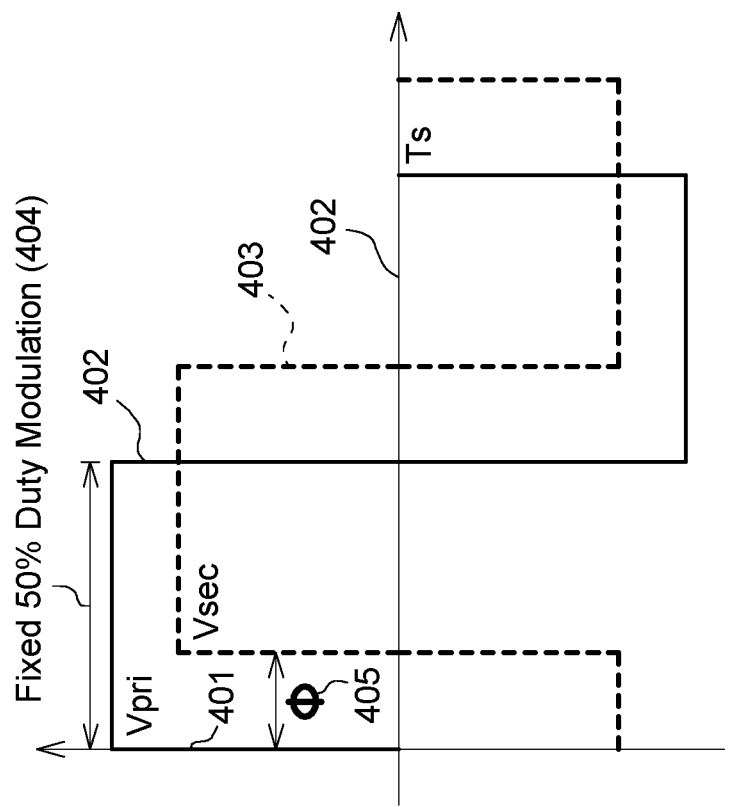
FIG. 4A is an illustrative graph of possible primary voltage and secondary voltage versus time for a fixed duty modulation or duty cycle (e.g., as observed at the transformer windings).

FIG. 4A is an illustrative graph of possible primary voltage 402 and secondary voltage 403 versus time associated with the transformer 14 in a first control mode 26 (e.g., phase shift control mode) for a fixed duty modulation (e.g., approximately 50 percent duty-cycle modulation at switches) at the transformer windings of transformer 14. In FIG. 4A, the vertical axis indicates signal magnitude 401 and the horizontal axis indicates time. The waveform of the primary voltage 402 is indicated by solid lines, whereas the waveform of the secondary voltage 403 is indicated by dashed lines.

For example, FIG. 4A illustrates the transformer waveforms that result across the primary winding 80 and the secondary winding 82 based on: (a) the phase shift 405 (ϕ) between a first phase of a control signal applied at control terminal 70 of a high-side switch (S1), of the first pair 50 of switches in a first phase, and a second phase of a control signal applied at control terminal 70 of a high-side switch (S5), of the third pair 54 of switches in a third phase of the secondary full bridge 12; and (b) a phase shift 405 (ϕ) between a third phase of a control signal applied at control terminal 70 of a low-side switch (S2), of the pair of switches in a first phase and a fourth phase of a control signal applied at control terminal 70 of a low-side switch (S6) of the third pair 54, of switches in a third phase of the secondary full bridge 12. The above phase shift 405 does not refer to the complementary phase shift (e.g., approximately 180 degrees) between the low-side switch and high-side switch of any phase of the primary full bridge 10 or the secondary full bridge 12. Instead, the electronic controller 38 or electronic data processor 32 determines another phase shift (ϕ) (e.g., to phase shift switches S5 and S8, with respect to switches S1 and S4, respectively, and to phase shift switches S6 and S7 with respect to switches S2 and S3, respectively, as illustrated in FIG. 3) in accordance with the following equation, as described above in greater detail:

$$\phi = \frac{\pi}{2}\left[1 - \sqrt{1 - \frac{8f_s L |P|}{n V_1 V_2}}\right].$$

FIG. 4B is an illustrative graph of possible primary voltage and secondary voltage versus time for a variable duty modulation associated with or at the transformer windings to control the inductor current L (through the model inductance 16 associated with the transformer 14 or its primary winding 80) to increase soft-switching events within a second control mode 28 (e.g., triangular waveform control mode) or a third control mode 30 (e.g., trapezoidal waveform control mode). Like reference numbers in FIG. 4A and FIG. 4B indicate like elements or features.

FIG. 4B illustrates the waveforms that result across the primary winding 80 and the secondary winding 82 for a variable duty modulation determined by or aligned with the transferred power. For example, the phase shift $\phi_{TRM}$ corresponds to a generally linear slope of output power versus output voltage for a respective operational mode based on maximum power transfer for a given control mode (e.g., second control mode 28 or third control mode 30). Further, the slope of transferred output power versus output voltage may intercept a midpoint of the output power for each control mode (e.g., triangular waveform control mode or trapezoidal waveform control mode) based on a lower limit and upper limit of output power for the respective control mode. In particular, FIG. 4B illustrates the waveforms that result across the primary winding 80 and the secondary winding 82 based on: (a) a variable or adjustable phase shift $\phi_{TRM}$ between the first pair 50 of switches in a first phase and the phase between the second pair 52 of switches in a second phase of the primary full bridge 10, and (b) a variable or adjustable phase shift $\phi_{TRM}$ between the third pair 54 of switches in a third phase and the fourth pair 56 of switches in a fourth phase of the secondary full bridge 12.

For the second control mode 28, the phase shift phase shift $\phi_{TRM}$ is determined in accordance with the following equation:

$$\phi_{TRM} = \pi \sqrt{f_s \cdot L \cdot P_{TRM} \cdot \frac{V_1 - nV_2}{V_1 \cdot (nV_2)^2}},$$

where $\phi_{TRM}$ is the phase shift (in radians) between midpoints of the primary voltage of the primary windings 80 and the secondary voltage of the secondary windings 82. Further, in the second control mode 28 the maximum power transferred is determined in accordance with the following equation:

$$P_{TRM,max} = \frac{n^2 V_2^2 (V_1 - nV_2)}{4 f_s L V_1},$$

where n is the transformer ratio between the primary winding 80 and the secondary winding 82; $V_1$ is input DC voltage to the primary full bridge 10 at the DC primary terminals 84, such as the input voltage provided by energy source 22; $V_2$ is the output DC voltage of the secondary full bridge 12 associated with DC secondary terminals 86; $f_s$ is the switching frequency of the switches; and L is the inductance modeled as a model inductance 16 in series with the primary winding 80 of the transformer 14.

Figure 5:
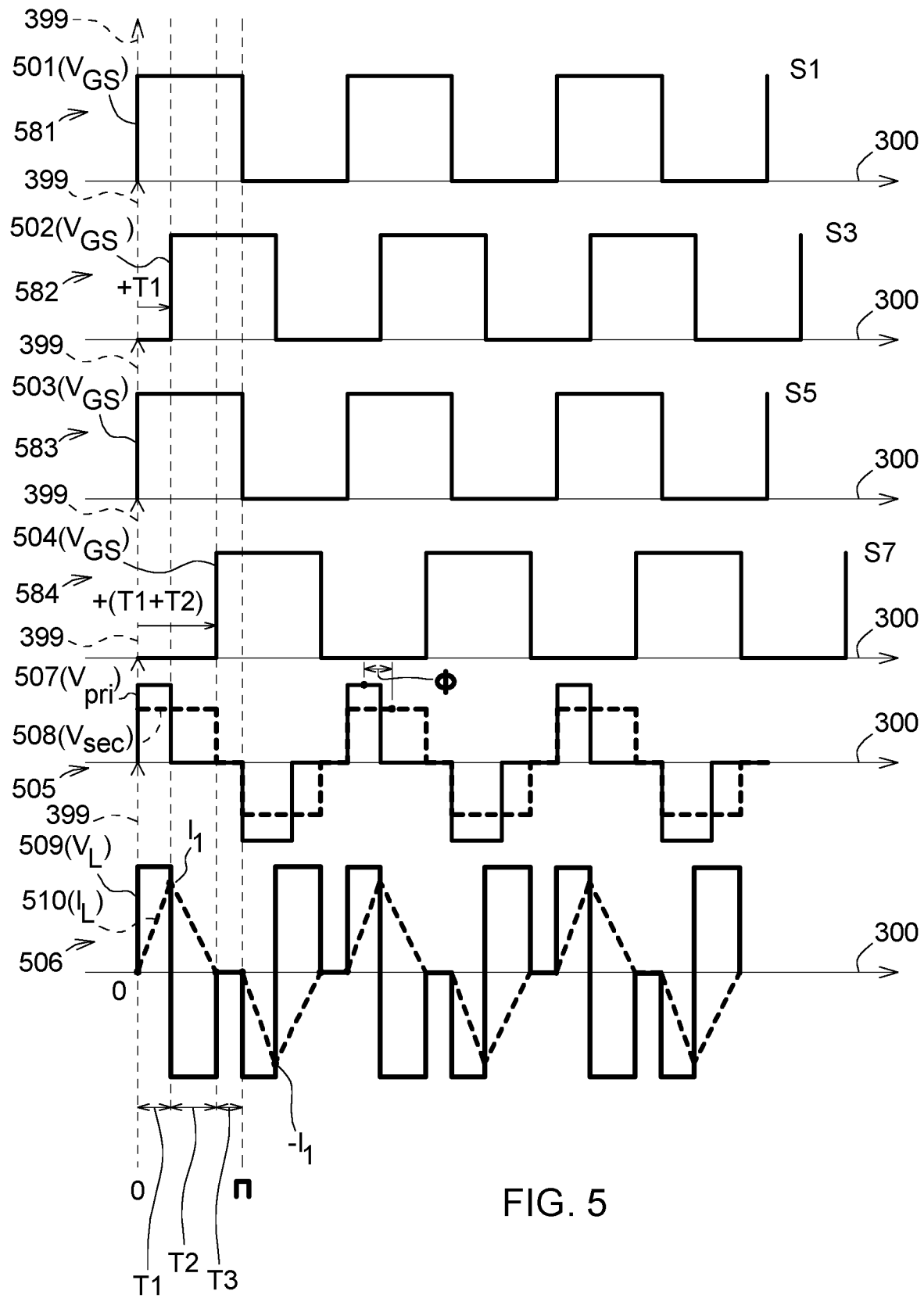
FIG. 5 is an illustrative graph of possible gate input voltage (e.g., $V_{GS}$) or base input voltage versus time of the switches in the converter for a second mode (e.g., triangular waveform control mode) and the associated primary voltage, secondary voltage, inductor voltage and inductor current for the converter assembly operating in the second mode.

FIG. 5 illustrates operation of the DC-to-DC converter 11 in the second control mode 28 (e.g., triangular waveform control mode). In FIG. 5, the primary switches 58 comprise a first pair 50 of switches for a first phase and second pair 52 of switches for a second phase. In the second control mode 28 and in the third control mode 30, the first pair 50 has a non-complementary phase offset (not 180 degree offset) with respect to the second pair 52. The secondary switches 60 comprise a third pair 54 of switches for a third phase and fourth pair 56 of switches for a fourth phase. In the second control mode 28 and the third control mode 30 the third pair 54 having a non-complementary phase offset (e.g. not 180 degrees offset) with respect to the fourth pair 56. However, similar to the first control mode 26, the operation of the second control 28 has complementary phase offset within each pair of switches of any phase. In the second control mode 28 within each of the first pair 50 and the second pair 52 the primary switches a high-side switch 64 has a complementary phase offset with respect to a low-side switch 62 and approximately fifty percent duty cycle. A fifty percent duty cycle means the low-side switch 62 or the high-side switch 64 within a pair is active or turned-on approximately one-half of the time, where approximately means a tolerance of plus or minus ten percent about the fifty percent duty cycle. Similarly, the secondary switches 60 comprise a third pair 54 of switches for a third phase and fourth pair 56 of switches for a fourth phase; in the second control mode 28 within each of the third pair 54 and the fourth pair 56 the primary switches 58 a high-side switch 64 has a complementary phase offset with respect to a low-side switch 62 and approximately fifty percent duty cycle.

FIG. 5 illustrates multiple control signals (501, 502, 503, 504) applied to control terminals 70 of the switches (58, 60) in the DC-to-DC converter 11 in the upper four graphs (501, 502, 503, 504) for the second control mode 28. The penultimate graph (505) shows respective primary voltage 507 ($V_{pri}$) in solid lines and secondary voltage 508 ($V_{sec}$) across the transformer 14 of the DC-to-DC converter 11. The last or bottom graph (506) shows the inductor voltage 509 ($V_L$) and inductor current 510 ($I_L$) associated with the inductor 16 or model inductance associated with the primary windings 80 of the transformer 14. For all of the graphs of FIG. 5, there is a common time scale along each horizontal axis 300 and separate signal magnitudes for each signal along each vertical axis 399, which are illustrated in dashed lines that terminate in upward pointing arrows. The relative phase shift (e.g., expressed in the time domain as T1 or T1+T2) between the control signals of ones of the switches, such as: (a) between primary switches 58 and secondary switches 60, (b) between the first pair 50 and the second pair 52 within the primary switches 58, and (c) between the third pair 54 and the fourth pair 56 within the secondary switches 60, are illustrated in FIG. 5. Meanwhile, the control signals (501, 502, 503, 504) are illustrated.

In one example, for the second control mode 28 the relative phase shift between the control signals applied to the switches of the converter 11 adhere to the following equation:

$T_1+T_2+T_3=T_s/2$, where $T_1$ is the first time delay or first relative phase shift (e.g., between the respective leading edges of control signals for switch S1 and switch S3), where $T_1+T_2$ is the second time delay or second relative phase shift (e.g., between the respective leading edges of control signals for S1 and S7), $T_3$ is a third time delay or third relative phase shift, and where Ts the time period or full duty cycle of the control signal, such that $T_s/2$ represents a fifty-percent duty cycle.

FIG. 5 illustrates multiple control signals to the DC-to-DC converter 11 in the upper four graphs (581, 582, 583, 584). The penultimate graph 505 shows respective primary voltage and second voltages across the transformer 14 of the DC-to-DC converter 11. The last or bottom 506 graph shows the inductor voltage ($V_L$) across the inductor terminals of inductor 16 and inductor current ($I_L$). For all of the graphs of FIG. 5, there is a common time scale 300 along each horizontal axis and separate signal magnitudes 399 for each signal along each vertical axis.

In FIG. 5, in the uppermost graph 581 the first control signal 501 is applied to the high-side switch 64 (S1) of the first pair 50 of primary switches 58. For example, if each switch is a field-effect transistor (FET), then control signal is applied as a control voltage or gate-source voltage ($V_{GS}$).

In the second uppermost graph 582, the second control signal 502 is applied to the high-side switch 64 (S3) of the second pair 52 of the primary switches 58. For example, if each switch is a field effect transistor (FET), then control signal is applied as a control voltage or gate-source voltage ($V_{GS}$).

In FIG. 5, in the third uppermost graph 583 the third control signal 503 is applied to the high-side switch 64 (S5) of the third pair 54 of switches (e.g., secondary switches 60). For example, if each switch is a field effect transistor (FET), then control signal is applied as a control voltage or gate-source voltage ($V_{GS}$).

In the fourth uppermost graph 584, the fourth control signal 504 is applied to the high-side switch 64 (S7) of the fourth pair 56 of the switches (e.g., secondary switches 60). For example, if each switch is a field effect transistor (FET), then control signal is applied as a control voltage or gate-source voltage ($V_{GS}$).

In the penultimate graph 505, the relative phase shift $\phi_{TRM}$ (e.g., fixed phase shift) between the primary voltage of the transformer 14 and the second voltage of the transformer 14 is shown. The primary voltage 507, which is associated with the terminals of the primary winding 80, is indicated as a solid line, whereas the secondary voltage in the secondary winding 82, which is associated with the terminals of the secondary winding 82, is indicated as a dashed line in the penultimate graph 505 of FIG. 5.

In the last graph 506 or bottom graph of FIG. 5, a signal output waveform is associated with the load 24 while the DC-to-DC converter 11 operates in the second control mode 28 (e.g., triangular waveform control mode). The inductor voltage 509 ($V_L$) across the terminals of the inductor 16 or model inductance is indicated by the solid line, whereas the inductor current 510 ($I_L$) is indicated by the dashed line in the last graph 506 of FIG. 5.

Figure 6:
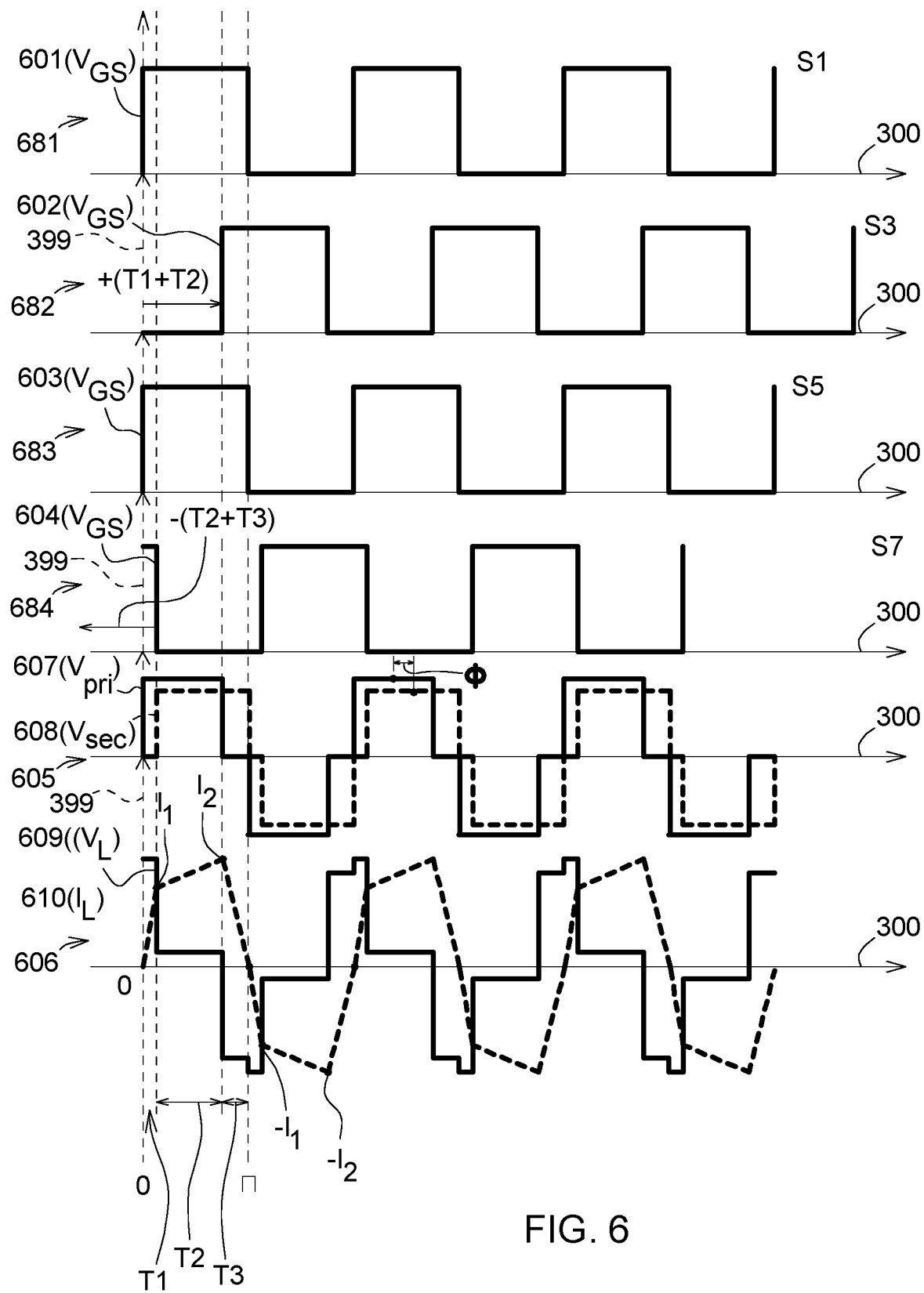
FIG. 6 is an illustrative graph of possible gate input voltage (e.g., $V_{GS}$) or base input voltage versus time of the switches in the converter for a third mode (e.g., trapezoidal waveform control mode) and the associated primary voltage, secondary voltage, inductor voltage and inductor current for the converter assembly operating in the third mode.

FIG. 6 illustrates operation of the DC-to-DC converter 11 in the third control mode 30 (e.g., trapezoidal waveform control mode). In FIG. 6, the primary switches 58 comprise a first pair 50 of switches for a first phase and second pair 52 of switches for a second phase. In the second control mode 28 and in the third control mode 30, the first pair 50 has a non-complementary phase offset (not 180 degree offset) with respect to the second pair 52. The secondary switches 60 comprise a third pair 54 of switches for a third phase and fourth pair 56 of switches for a fourth phase. In the second control mode 28 and the third control mode 30 the third pair 54 having a non-complementary phase offset (e.g. not 180 degrees offset) with respect to the fourth pair 56.

However, similar to the first control mode 26, the operation of the third control mode 30 has complementary phase offset within each pair of switches of any phase. In the third control mode 30 within each of the first pair 50 and the second pair 52 the primary switches a high-side switch 64 has a complementary phase offset with respect to a low-side switch 62 and approximately fifty percent duty cycle. A fifty percent duty cycle means the low-side switch 62 or the high-side switch 64 within a pair is active or turned-on approximately one-half of the time, where approximately means a tolerance of plus or minus ten percent about the fifty percent duty cycle. Similarly, the secondary switches 60 comprise a third pair 54 of switches for a third phase and fourth pair 56 of switches for a fourth phase; in the third control mode 30 within each of the third pair 54 and the fourth pair 56 the primary switches 58 a high-side switch 64 has a complementary phase offset with respect to a low-side switch 62 and approximately fifty percent duty cycle.

In the third control mode 30 (e.g., the trapezoidal waveform control mode) the phase shift ($\phi$ or $\phi_{trap}$) is determined in accordance with the following equations:

$$\phi = \frac{\pi}{2} \cdot \frac{\text{sgn}(P)}{V_1^2 + nV_1V_2 + (nV_2)^2} \cdot \left\{ V_1^2 + (nV_2)^2 - (V_1 + nV_2)\sqrt{nV_1V_2\left[1 - \frac{4f_sLP(V_1^2 + nV_1V_2 + (nV_2)^2}{(nV_1V_2)^2}\right]} \right\}, \text{ where}$$

$$P = \text{sgn}(\phi)\frac{nV_1V_2 \cdot [2nV_1V_2(\pi^2 - 2\phi^2) - (V_1^2 + (nV_2)^2) \cdot (\pi - 2|\phi|)^2]}{4\pi^2 f_sL \cdot (V_1 + nV_2)^2}$$

However, in the third control mode 30, the maximum phase shift is limited to a maximum phase shift in accordance to with the following equation:

$$\phi_{trap,max} = \frac{\pi}{2}\left(1 - \frac{nV_1V_2}{V_1^2 + nV_1V_2 + (nV_2)^2}\right)$$

Further, the following conditions (e.g., boundary conditions) are required to operate in the third mode 30 (e.g., trapezoidal mode):

$$Vpri \cong n \cdot V_{sec}$$
$$T_1 + T_2 + T_3 = T_s/2$$
$$T_1 + T_2 + T_3 \geq 0, \text{ where:}$$
$$T_1 = \frac{nV_2 - V_1 + 2V_1\phi/\pi}{2f_s \cdot (V_1 + nV_2)},$$
$$T_2 = \frac{1 - 2\phi/\pi}{2f_s}, \text{ and}$$
$$T_3 = \frac{V_1 - nV_2 + 2nV_2\phi/\pi}{2f_s \cdot (V_1 + nV_2)}$$

Where $T_1$ is a first control variable, $T_2$ is a second control variable and $T_3$ is a third control variable. In one configuration $T_1$, $T_2$ and $T_3$ represent time equivalent of phase shifts between the various pairs of control signals applied to the control terminals 70 of switches (58, 60).

In the third control mode 30 the maximum power transferred is determined in accordance with the following equation:

$$P_{TZM,max} = \frac{(nV_1V_2)^2}{4f_sL(V_1^2 + nV_1V_2 + (nV_2)^2)}$$

FIG. 6 illustrates multiple control signals (601, 602, 603, 604) to the DC-to-DC converter 11 in the upper four graphs (681, 682, 683, 684). The penultimate graph 605 shows respective primary voltage 607 ($V_{pri}$) and secondary voltage 608 ($V_{sec}$) across the primary winding 80 and secondary winding 82, respectively, of the transformer 14 of the DC-to-DC converter 11. The last or bottom graph 606 shows the inductor voltage 609 ($V_L$) and inductor current 610 ($I_L$) associated with inductor 16 or model inductance associated with the primary winding 80 of transformer 14. For all of the graphs of FIG. 6, there is a common time scale 300 along each horizontal axis and separate signal magnitudes 399 for each signal along each vertical axis. The relative phase shift $\phi_{trap}$ (e.g., expressed in the time domain as $T_1+T_2$ or $T_2+T_3$) between the control signals of ones of the switches, such as: (a) between primary switches 58 and secondary switches 60, (b) between the first pair 50 and the second pair 52 within the primary switches 58, and (c) between the third pair 54 and the fourth pair 56 within the secondary switches 60, are illustrated in FIG. 6.

In FIG. 6, in the uppermost graph 681 the first control signal 601 is applied to the high-side switch 64 (S1) of the first pair 50 of primary switches 58. For example, if each switch is a field-effect transistor (FET), then control signal is applied as a control voltage or gate-source voltage ($V_{GS}$).

In the second uppermost graph 682, the second control signal 602, with a first phase offset (e.g., $T_1+T_2$), is applied to the high-side switch 64 (S3) of the second pair 52 of the primary switches 58. For example, if each switch is a field effect transistor (FET), then control signal is applied as a control voltage or gate-source voltage ($V_{GS}$).

In FIG. 6, in the third uppermost graph 683 the third control signal 603 is applied to the high-side switch 64 (S5) of the third pair 54 of switches (e.g., secondary switches 60). Here, in FIG. 6 the switches S1 and S5 may be aligned in phase of their respective control signals applied to their control inputs 70. For example, if each switch is a field effect transistor (FET), then control signal is applied as a control voltage or gate-source voltage ($V_{GS}$).

In the fourth uppermost graph, the fourth control signal 604 is applied to the high-side switch 64 (S7) of the fourth pair 56 of the switches (e.g., secondary switches 60), where switch S7 has a second phase offset (e.g., $-(T_2+T_3)$) with respect to switch S5. For example, if each switch is a field effect transistor (FET), then control signal is applied as a control voltage or gate-source voltage ($V_{GS}$).

In one example, for the third control mode 30 the relative phase shift between the control signals applied to the switches of the converter 11 adhere to the following equation:

$T_1+T_2+T_3=T_s/2$, where $T_1+T_2$ is the first time delay or first relative phase shift (e.g., between the respective leading edges of control signals for switch S1 and switch S3), where $-(T_1+T_2)$ is the second time delay or second relative phase shift (e.g., between the respective leading edges of control signals for S1 and S7), $T_3$ is a third time delay or third relative phase shift associated with the control signals of the switches of the converter 11, and where $T_s$ the time period or full duty cycle of the control signal, such that $T_s/2$ represents a fifty-percent duty cycle.

In the penultimate graph 605, the relative phase shift ($\phi$ or $\phi_{trap}$ (e.g., variable phase shift or transferred-power-based phase shift)) between the primary voltage 607 ($V_{pri}$) of the transformer 14 (e.g., where the primary voltage 607 ($V_{pri}$) may be defined to include the inductor voltage of inductor 16 in some embodiments) and the secondary voltage 608 ($V_{sec}$) of the transformer 14 is shown. The primary voltage 607 is indicated as a solid line, whereas the secondary voltage 608 is indicated as a dashed line in the penultimate graph 605 of FIG. 6.

In the last graph 606 or bottom graph of FIG. 6, a signal output waveform is associated with the load 24 while the DC-to-DC converter 11 operates in the first control mode 26.

FIG. 7 is an illustrative graph of operational modes associated with efficiency and transferred power to a load 24.

During the initialization or start-up time period for the converter 11, the electronic controller 38 or data processor 32 is configured to control the converter 11 to operate in the first control mode 26. After the initialization or start-up time period for the converter 11, an electronic data processor 32 controls the converter 11 to operate efficiently in a first control mode 26, a second control mode 28, or a third control mode 30, wherein the first control mode 26 comprises a phase shift mode, the second control mode 28 comprises a triangular waveform control mode and wherein the third control mode 30 comprises a trapezoidal waveform control mode.

In FIG. 7, each control mode (26, 28, 30) is associated with a corresponding operational region (701, 702, 703) or respective transferred power range. For example, the second control mode 28 (e.g., triangular waveform control mode) is associated with a second region 702 (e.g., rectangular operational region) associated with a lowest range of transferred power of the DC-to-DC converter 11; the third control mode 30 (e.g., trapezoidal waveform control mode) is associated with a third region 703 (e.g., rectangular operational region) with an intermediate range of transferred power that is greater than the lowest range of transferred power of the DC-to-DC converter 11; the first control mode 26 (e.g., phase shift control mode) is associated with a first region 701 (e.g., rectangular operational region) with a highest range of transferred power of the DC-to-DC converter 11. A transition power threshold (36, 136) defines a boundary (e.g., vertical line segment) between two adjacent regions in FIG. 7.

In FIG. 7, the vertical axis represents efficiency 90 of the converter, which can be measured as percentage efficiency. The horizontal axis represents transferred power 88, which may be measured in watts, for example. As illustrated in FIG. 7, the proposed modulation line 705 of the converter 11 is shown as a solid line and represents the data processor 32 or electronic controller 38 selecting a control mode within each corresponding region (701, 702, 703) based on the transferred power (88) of the DC-to-DC converter 11. The existing phase-shift-only modulation of the converter 11 is shown as a dashed line to compare the efficiency of the existing phase-shift mode to the improved efficiency of the three-mode system set forth in this disclosure.

Advantageously, the electronic controller 38 or data processor 32 is well suited to select one or more control modes (26, 28, 30) among the available control modes to maximize efficiency. In one embodiment, the electronic controller 38 or data processor 32 is configured to select a preferential operational mode for a time interval based on whether or not the DC-to-DC converter is at a transition power level threshold based on voltage sensor readings, by a first voltage sensor 46 (in FIG. 1A) and a second voltage sensor 48 (in FIG. 1A), associated with or proportional to the primary voltage (307, 507, 607) and the secondary voltage (308, 508, 608), respectively. The electronic controller 38 or data processor 32 is configured to provide soft switching (ZVS, ZCS, or both) of the primary switches 58 and the secondary switches 60 to reduce or minimize switching losses based on observed voltage sensor readings, by a first voltage sensor (46 or 146) and a second voltage sensor (48 or 148), for respective time intervals. For one or more control modes for each interval, the data processor 32 or electronic controller 38 determines the transferred power in accordance with the applicable transferred power equation based on the observed primary voltage (307, 507, 607) and the observed secondary voltage (308, 508, 608) for the interval and reference parameters of the DC-to-DC converter 11, which may be stored or retrieved from the data storage device 40.

For each time interval, the electronic controller 38 or data processor 32 estimates whether the determined transferred power is within the operational region (701, 702, 703), zone, range or limits (e.g., lower limit, upper limit, or both) of a corresponding control mode (e.g., 26, 28, 30 within a corresponding operational region) or multiple control modes (e.g., at a boundary between operational regions). If the determined transferred power of the converter 11 is within a respective operational region (701, 702, 703), the electronic controller 38 or data processor 32 selects the control mode (26, 28, 30) corresponding to the respective operational region as the preferential control mode for a time interval.

In one embodiment, the first control mode 26 is associated with a first power range, of a load 24, that is greater than a second power range of the second control mode 28 and a third power range of the third control mode 30. The second control mode 28 is associated with a second power range, of a load 24, that is lower than the first power range of the first control mode 26 and that is lower than the third power range of the third control mode 30. The third control mode 30 is associated with a third power range, of a load 24, that is lower than the first power range of the first control mode 26 and that is greater than the second power range of the second control mode 28.

For example, in the first power range, if the transferred power falls between the second boundary (e.g., approximately 6900 Watts) and a third boundary (e.g., maximum transferred energy in the first control mode 26), the respective first region 701 (e.g., first operational zone) comprises the first control mode 26 (e.g., phase shift control mode) as the preferential control mode. Therefore, the electronic controller 38 or data processor 32 will control the control signals to the primary switches 58 and secondary switches 60 consistent with any phase offset(s) required to operate in the second control mode 28 as the preferential control mode. For example, each phase offset for an interval is determined in accordance with a fixed phase offset or another phase offset that the data processor 32 determines based on a data structure (e.g., look-up table) stored as reference data in the data storage device 40.

For example, in the second power range, if the transferred power falls between zero and a first boundary (e.g., approximately 3600 Watts) or transition power threshold 36, the respective second region 702 (e.g., second operational zone) comprises the second control mode 28 (e.g., triangular waveform control mode) as the preferential control mode. Therefore, the electronic controller 38 or data processor 32 will control the control signals to the primary switches 58 and secondary switches 60 consistent with any phase offset(s) required to operate in the second control mode 28 as the preferential control mode. For instace, the phase offset is determined in accordance with a phase offset for the second control mode 28 that the data processor 32 determines based on the application of an equation or based on a data structure (e.g., look-up table) stored as reference data in the data storage device 40.

For example, in the third power range, if the transferred power falls between a first boundary (e.g., approximately 3600 Watts) and a second boundary (e.g., approximately 6900 Watts) or between a first transition power threshold 36 and second transition power threshold 136, the respective third region 703 (e.g., third operational zone) comprises the third control mode 30 (e.g., trapezoidal waveform control mode) as the preferential control mode. Therefore, the electronic controller 38 or data processor 32 will control the control signals to the primary switches 58 and secondary switches 60 consistent with any phase offset required to operate in the third control mode 30 as the preferential control mode. For example, the phase offset is determined in accordance with a phase offset for the third control mode 30 that the data processor determines based on the application of an equation or based on a data structure (e.g., look-up table) stored as reference data in the data storage device 40.

First, the first control mode 26 is the least efficient among the possible control modes, such as the second control mode 28 and the third control mode 30. The first control mode 26 is the most versatile power transfer range and can be substituted for the second control mode 28 or the third control mode 30 with the attendant loss of efficiency, even outside of the first region 701 (e.g., first operational region) associated with the first control mode 26, or phase shift control mode. Accordingly, the first control mode 26 may be used for initialization or start-up of the DC-to-DC converter 11 before the transferred power is estimated, provided that the transferred power is less than a maximum allowable transferred power of the DC-to-DC converter 11. The first control mode 26 is associated with a lowest ratio of possible soft switching states to all possible switching states, where the lowest ratio is less than an intermediate ratio of possible soft switching states to all possible switching states) and less than the highest ratio (of possible soft switching states to all possible switching states). For example, in one embodiment, the first control mode 26 or the phase shift mode has the fewest soft switching events at 8/16 switching states.

Second, the second control mode 28 or the triangular waveform control mode offers the highest potential efficiency because the triangular mode has the most soft-switching events or highest ratio of possible soft switching states to all possible switching states. For example, in one embodiment the highest ratio is approximately 14/16 of possible soft switching states to all possible switching states. However, the second control mode 28 or triangular mode is limited to the operational zone associated with the lowest power transfer range in FIG. 7, among the three possible modes.

Third, the third control mode 30 or trapezoidal waveform mode is more efficient than the first control mode 26 or phase shift mode. The third control mode 30 is associated with an intermediate ratio of possible soft switching states to all possible switching states, where the corresponding soft switching states/events are less than the highest ratio and greater than the lowest ratio. The third control mode 30 has the intermediate soft switching of possible soft switching states to all possible switching states. For example, in one embodiment, the intermediate level has approximately 12/16 of possible soft switching states to all possible switching states. However, the third control mode 30 or trapezoidal mode is limited to the operational zone associated with an intermediate power transfer range in FIG. 7, which is between the power transfer ranges of the first mode (e.g., phase shift mode) and the second mode (e.g., triangular mode).

The electronic controller 38 or data processor 32 determines dynamically the transition voltage level between the modes based on the maximum achievable power transfer for any respective mode. For any mode, the maximum achievable power transfer depends upon the DC primary voltage ($V_1$), at DC primary terminals 84, and the DC secondary voltage ($V_2$), at DC secondary terminals 86. The DC primary voltage (V may be referred to as the primary input voltage of the primary full bridge 10, whereas the DC secondary voltage ($V_2$) may be referred to as the secondary output voltage of the secondary full bridge 12. In the DC-to-DC converter 11, the maximum achievable power transfer for the first control mode 26 is $P_{PS,max}$ is described in the previous equation set forth in this disclosure; the maximum achievable power for the second control mode 28 is $P_{TRM,max}$, and is described in the previous equation set forth in this disclosure, and the maximum achievable power for the third control mode 30 is $P_{TZM,max}$ as described in the previous equations set forth in this disclosure.

In certain applications, the transformer winding ratio and the inductance of the transformer 14 are constants; where the primary input voltage ($V_1$) is varied and where the secondary output voltage ($V_2$) is regulated to a fixed value for a dynamic load.

In some applications or vehicle configurations, $V_1$ varies and $V_2$ is fixed. $V_1$ may vary based on application or transient load 24 conditions on direct current bus that is shared by $V_1$. Although the primary voltage, the secondary voltage, and the frequency $f_s$ may vary in certain applications or vehicle configurations, n and the inductance L of the transformer 14 do not vary. In one embodiment, an electronic controller 38 or data processor 32 determines dynamically, at each time interval or at successive time intervals, a transition power level threshold that depends upon an observed primary voltage across the transformer primary winding terminals 80 (or DC primary terminals 84 of the converter) or the fixed or observed secondary voltage across the transformer secondary terminals (or DC secondary terminals 86 of the converter), where the primary voltage is varied, where a load 24 on the secondary terminals is fixed, where the transformer winding ratio (n) and the inductance of the transformer 14 are constants.

In one embodiment, the electronic controller 38 or data processor 32 determines (e.g., at runtime or initialization of the converter) the transition power level threshold for each one of the control modes at a boundary between two adjacent ones of the control modes based on the power transfer required by the load 24, a primary transition power level threshold associated with a primary boundary between the second control mode 28 and the third control mode 30 and a secondary transition power level threshold associated with a secondary boundary between the third control mode 30 and the first control mode 26, wherein the primary power level threshold is associated with less power transfer associated with the load 24, at the secondary output of the secondary full bridge 12, than the secondary power level threshold. In one configuration transition power level threshold is associated with a corresponding hysteresis band to avoid repeated subsequent oscillatory switching between two adjacent regions (701, 702, 703) (or associated respective control modes) within a time interval after a preliminary switch between two adjacent regions (701, 702, 703) (or associated respective control modes). In another configuration transition power level threshold is associated with a corresponding hysteresis band to avoid repeated subsequent oscillatory switching between any two respective control modes (26, 28, 30) (e.g., within a time interval or user-definable time period) after a preliminary switch between respective control modes (26, 28, 30).

In some configurations, the conduction losses are associated with the parameters of the switches (58, 60), such as the on-state, drain-source resistance for a field-effect transistor of each switch, in the primary full bridge 10 and the secondary full bridge 12 and wherein the conduction losses may depend upon whether the duty cycle of the switches or whether the modulation duty-cycle at the transformer windings, or at the switches of the converter, is varied or not.

In any and all operational control modes, current flows in diodes 66 in parallel with the primary and secondary switches 60 to supports zero voltage turn-on of the primary and secondary switches 60 in any of the three control modes (26, 28, 30). In the second control mode 28 or the third control mode 30, the electronic controller 38 or data processor 32 is configured to control a high-side switch 64 (S1) of the first pair 50 of the primary switches 58 to be in phase with a high-side switch 64 (S5) of the third pair 54 of the secondary switches 60. Further, in the second control mode 28 or in the third control mode 30 the electronic controller 38 or data processor 32 is configured to control a high-side switch 64 (S3) of the second pair 52 of the primary switches 58 to have a phase offset with respect to a high-side switch 64 (S7) of the fourth pair 56 of the secondary switches 60 to establish voltage in the transformer 14 that is supportive of zero current turn-on and zero current-turn off events (states) for the primary switches 58 and secondary switches 60. At the control terminals 70 in the first control mode 26, the primary switches 58 have a fixed duty cycle and variable or fixed phase offset, ø, with respect to the secondary switches 60. For example, electronic controller or data processor is configured to control the control terminals in the first control mode such that the primary switches have a fixed duty cycle and varied phase offset with respect to the secondary switches based on a target power output (e.g., available at a load 24).

While the disclosure has been illustrated and described in detail in the drawings and foregoing description, such illustration and description is to be considered as exemplary and not restrictive in character, it being understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

The invention claimed is:

1. A method of controlling a direct-current-to-direct-current converter wherein a primary full bridge is coupled to a secondary full bridge via a transformer, the method comprising:
   after the start-up time period, controlling the converter to operate efficiently in a first control mode, a second control mode, or a third control mode, wherein the first control mode comprises a phase shift mode, the second control mode comprises a triangular waveform control mode and wherein the third control mode comprising a trapezoidal waveform control mode;
   determining a maximum target power range and a transition power level threshold for each one of the control modes;

estimating the transition power level threshold based on reference loss data stored in a data storage device, the reference loss data based on predetermined or simulated converter switching losses and conduction losses associated with different control modes or based on measurements of observed primary voltage and observed secondary voltage applied to corresponding equations for one or more respective control modes;

managing the transition between or among the control modes based on the maximum target power range and the estimated power level threshold, wherein the control modes apply time-synchronized control signals to respective control terminals of primary switches in the primary full bridge and to secondary switches in the secondary full bridge; wherein:

the first control mode is associated with a lowest ratio of possible switching states with corresponding soft switching events that are less than an intermediate ratio of possible switching states and a highest ratio of possible switching states;

the second control mode comprises is associated with the highest ratio of possible switching states with corresponding soft switching events; and the third control mode is associated with an intermediate ratio of possible switching states with corresponding soft switching events that are less than the highest ratio and greater than the lowest ratio.

2. The method according to claim 1 wherein the converter comprises a single phase, dual active bridge direct current (DC)-to-DC converter with direct current input terminals at the primary full bridge and direct current output terminals at the secondary full bridge.

3. The method according to claim 1 further comprising:
during the start-up time period, controlling the converter to operate in the first control mode.

4. The method according to claim 1 wherein the estimating of the transition power level threshold determined at runtime comprises selecting an optimal control mode among the control modes to provide maximum soft switching of the primary switches and the secondary switches to reduce or minimize switching losses.

5. The method according to claim 1 wherein the primary switches comprise a first pair of switches for a first phase and second pair of switches for a second phase, in the first control mode the first pair having complementary phase offset (approximately 180 degrees offset) with respect to the second pair; within each of the first pair and the second pair the primary switches a high-side switch has a complementary phase offset with respect to a low-side switch and approximately fifty percent duty cycle;

the secondary switches comprising a third pair of switches for a third phase and fourth pair of switches for a fourth phase, in the first control mode the third pair having complementary phase offset (approximately 180 degrees offset) with respect to the fourth pair; within each of the third pair and the fourth pair the primary switches a high-side switch has a complementary phase offset with respect to a low-side switch and approximately fifty percent duty cycle.

6. The method according to claim 1 wherein the primary switches comprise a first pair of switches for a first phase and second pair of switches for a second phase, in the second control mode and in the third control mode the first pair having a non-complementary phase offset (not 180 degrees offset) with respect to the second pair; within each of the first pair and second pair the primary switches a high-side switch has a complementary phase offset with respect to a low-side switch and approximately fifty percent duty cycle;

the secondary switches comprising a third pair of switches for a third phase and fourth pair of switches for a fourth phase, in the second control mode and the third control mode the third pair having a non-complementary phase offset (e.g. not 180 degrees offset) with respect to the fourth pair; within each of the third pair and the fourth pair the primary switches a high-side switch has a complementary phase offset with respect to a low-side switch and approximately fifty percent duty cycle.

7. The method according to claim 1 wherein within the second control mode and the third control mode a high-side switch of the first pair of the primary switches is in phase with a high-side switch of the third pair of the secondary switches and wherein a high-side switch of the second pair of the primary switches has a phase offset with a high-side switch of the fourth pair of the secondary switches to establish voltage in the transformer that is supportive of zero current turn-on and zero current-turn off events (states) for the primary switches and secondary switches.

8. The method according to claim 1 wherein current flows in diodes in parallel with the primary and secondary switches to supports zero voltage turn-on of the primary and secondary switches in any of said control modes.

9. The method according to claim 1 wherein a transition power level threshold is determined dynamically and depends upon a primary input voltage across primary input terminals or the secondary output voltage across the secondary output terminals, where the transformer winding ratio and the inductance of the transformer are constants; where the primary input voltage is varied and where the secondary output voltage is regulated to a fixed value for a dynamic load.

10. The method according to claim 1 wherein, at the control terminals in the first control mode, the primary switches have a fixed duty cycle and varied phase offset with respect to the secondary switches based on target power output.

11. The method according to claim 1 wherein the first control mode is associated with a first power range, of a load, that is greater than a second power range of the second control mode and a third power range of the third control mode.

12. The method according to claim 1 wherein the second control mode is associated with a second power range, of a load, that is lower than the first power range of the first control mode and that is lower than the third power range of the third control mode.

13. The method according to claim 1 wherein the third control mode is associated with a third power range, of a load, that is lower than the first power range of the first control mode and that is greater than the second power range of the second control mode.

14. The method according to claim 1 wherein the transition power level thresholds are determined at runtime of the converter for each one of the control modes as a boundary between two adjacent ones of the control modes based on the power transfer required by the load, a primary transition power level threshold associated with a primary boundary between the second control mode and the third control mode and a secondary transition power level threshold associated with a secondary boundary between the third control mode and the first control mode, wherein the primary power level threshold is associated with less power transfer associated with the load, at the secondary output of the secondary full bridge, than the secondary power level threshold.

15. The method according to claim 1 wherein the transition power level threshold is associated with a corresponding hysteresis band to avoid repeated subsequent oscillatory switching between two control modes after a preliminary switch between two control modes.

16. The method according to claim 1 wherein the conduction losses are associated with the parameters of the switches, such as the on-state, drain-source resistance for a field-effect transistor of each switch, in the primary full bridge and the secondary full bridge and wherein the conduction losses may depend upon whether the duty cycle of the switches is varied or not.

17. A system of controlling a direct current to direct current converter,
the system comprising:
a primary full bridge comprising first pair of primary switches and a second pair of primary switches coupled between direct current input terminals of the primary full bridge;
a secondary full bridge comprising a first pair of secondary switches and second pair of secondary switches coupled between direct current output terminals of the secondary full bridge;
a transformer coupled between the primary full bridge and the secondary full bridge, a primary winding of the transformer coupled to output terminals of the first pair and second pair of primary switches, a secondary winding of the transformer coupled to output terminals of the secondary switches;
a load for coupling to the direct current output terminals;
wherein an electronic controller is configured to provide time-synchronized control signals to the control terminals of the primary switches and secondary switches to control the converter to operate efficiently in a first control mode, a second control mode, or a third control mode, wherein the first control mode comprises a phase shift mode, the second control mode comprises a triangular waveform control mode and wherein the third control mode comprising a trapezoid waveform control mode;
the electronic controller configured to determine a maximum target power range and a transition power level threshold for each one of the control modes;
the electronic controller configured to estimate the transition power level threshold based on reference loss data stored in a data storage device, the reference loss data based on predetermined or simulated converter switching losses and conduction losses associated with different control modes, based on measurements of observed primary voltage and observed secondary voltage to corresponding equations for one or more respective control modes;
the electronic controller managing the transition between or among the control modes based on the maximum target power range and the estimated power level threshold; wherein:
the first control mode is associated with a lowest ratio of possible switching states with corresponding soft switching events that are less than an intermediate ratio of possible switching states and a highest ratio of possible switching states;
the second control mode comprises is associated with the highest ratio of possible switching states with corresponding soft switching events;
the third control mode is associated with an intermediate ratio of possible switching states with corresponding soft switching events that are less than the highest ratio and greater than the lowest ratio.

18. The system according to claim 17 wherein, at the control terminals in the first control mode, the primary switches have a fixed duty cycle and varied phase offset with respect to the secondary switches based on a target power output.

19. The system according to claim 17 wherein the primary switches comprise a first pair of switches for a first phase and second pair of switches for a second phase, in the first control mode the first pair having complementary phase offset (180 degrees offset) with respect to the second pair; within each of the first pair and second pair the primary switches a high-side switch has a complementary phase offset with respect to a low-side switch and approximately fifty percent duty cycle;
the secondary switches comprising a third pair of switches for a third phase and fourth pair of switches for a fourth phase, in the first control mode the third pair having complementary phase offset (180 degrees offset) with respect to the fourth pair; within each of the third pair and the fourth pair the primary switches a high-side switch has a complementary phase offset with respect to a low-side switch and approximately fifty percent duty cycle.

20. The system according to claim 17 wherein the primary switches comprise a first pair of switches for a first phase and second pair of switches for a second phase, in the second control mode and in the third control mode the first pair having a non-complementary phase offset (not 180 degree offset) with respect to the second pair; within each of the first pair and second pair the primary switches a high-side switch has a complementary phase offset with respect to a low-side switch and approximately fifty percent duty cycle;
the secondary switches comprising a third pair of switches for a third phase and fourth pair of switches for a fourth phase, in the second control mode and the third control mode the third pair having a non-complementary phase offset (e.g. not 180 degrees offset) with respect to the fourth pair; within each of the third pair and the fourth pair the primary switches a high-side switch has a complementary phase offset with respect to a low-side switch and approximately fifty percent duty cycle.

21. The system according to claim 17 wherein for the second control mode the third control mode a high-side switch of the first pair of the primary switches is in phase with a high-side switch of the third pair of the secondary switches and wherein a high-side switch of the second pair of the primary switches has a phase offset with a high-side switch of the fourth pair of the secondary switches to establish voltage in the transformer that is supportive of zero current turn-on and zero current-turn off events (states) for the primary switches and secondary switches.

22. The system according to claim 17 wherein current flows in diodes in parallel with the primary and secondary switches to supports zero voltage turn-on of the primary and secondary switches in any of said control modes.

23. A method of controlling a direct-current-to-direct-current converter wherein a primary full bridge is coupled to a secondary full bridge via a transformer, the method comprising:
after the start-up time period, controlling the converter to operate efficiently in a first control mode, a second control mode, or a third control mode; wherein the first control mode comprises a phase shift mode, wherein the second control mode comprises a triangular waveform control mode, and wherein the third control mode comprising a trapezoidal waveform control mode;

determining a maximum target power range and a transition power level threshold for each one of the control modes;

estimating the transition power level threshold based on reference loss data stored in a data storage device, the reference loss data based on predetermined or simulated converter switching losses and conduction losses associated with different control modes or based on measurements of observed primary voltage and observed secondary voltage applied to corresponding equations for one or more respective control modes; and managing the transition between or among the control modes based on the maximum target power range and the estimated power level threshold, wherein the control modes apply time-synchronized control signals to respective control terminals of primary switches in the primary full bridge and to secondary switches in the secondary full bridge.

24. The method according to claim 23 wherein the estimating of the transition power level threshold determined at runtime comprises selecting an optimal control mode among the control modes to provide maximum soft switching of the primary switches and the secondary switches to reduce or minimize switching losses.

* * * * *